United States Patent
Yoo et al.

(10) Patent No.: US 11,425,778 B2
(45) Date of Patent: Aug. 23, 2022

(54) METHOD AND APPARATUS FOR INTERWORKING BETWEEN NETWORKS IN WIRELESS COMMUNICATION SYSTEM

(71) Applicant: Samsung Electronics Co., Ltd, Suwon-si (KR)

(72) Inventors: Seungbo Yoo, Yongin-si (KR); Daejoong Kim, Yongin-si (KR); Hyejeong Kim, Suwon-si (KR); Dongmin Kim, Seongnam-si (KR); Namryul Jeon, Seoul (KR); Moongyo Bae, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 190 days.

(21) Appl. No.: 16/478,815

(22) PCT Filed: Jan. 17, 2018

(86) PCT No.: PCT/KR2018/000809
§ 371 (c)(1),
(2) Date: Jul. 17, 2019

(87) PCT Pub. No.: WO2018/135861
PCT Pub. Date: Jul. 26, 2018

(65) Prior Publication Data
US 2021/0136859 A1    May 6, 2021

(30) Foreign Application Priority Data

Jan. 17, 2017  (KR) .................. 10-2017-0008345
Feb. 13, 2017  (KR) .................. 10-2017-0019650
Feb. 23, 2017  (KR) .................. 10-2017-0024409

(51) Int. Cl.
*H04W 76/25*  (2018.01)
*H04W 76/27*  (2018.01)
(Continued)

(52) U.S. Cl.
CPC .......... *H04W 76/25* (2018.02); *H04L 69/161* (2013.01); *H04L 69/22* (2013.01); *H04W 76/27* (2018.02); *H04W 88/16* (2013.01)

(58) Field of Classification Search
None
See application file for complete search history.

(56) References Cited

U.S. PATENT DOCUMENTS 10,149,206 B2   12/2018  Liu
2007/0224988 A1   9/2007  Shaheen
(Continued)

FOREIGN PATENT DOCUMENTS

KR  10-2012-0079152 A   7/2012
KR  10-2016-0130275 A   11/2016
WO     2016/137174 A1   9/2016

OTHER PUBLICATIONS

International Search Report dated Apr. 20, 2018 in connection with International Patent Application No. PCT/KR2018/000809, 2 pages.
Written Opinion of the International Search Authority dated Apr. 20, 2018 in connection with International Patent Application No. PCT/KR2018/000809, 6 pages.
(Continued)

*Primary Examiner* — Basil Ma

(57) ABSTRACT

This disclosure relates to a 5G or pre-5G communication system supporting a higher data rate than a 4G communication system such as LTE. More specifically, a method for performing, by a terminal, communication in a wireless communication system of the present invention comprises: a step of performing a connection procedure for a first wireless network; a step of performing a connection procedure for a second wireless network; and a step of performing communication for the same service through the first wireless network or the second wireless network according to wireless link states of the first wireless network and the second wireless network.

15 Claims, 25 Drawing Sheets

(51) Int. Cl.
*H04L 69/16* (2022.01)
*H04L 69/22* (2022.01)
*H04W 88/16* (2009.01)

(56) References Cited

U.S. PATENT DOCUMENTS

| | | |
|---|---|---|
| 2008/0268843 A1 | 10/2008 | Ore et al. |
| 2012/0008578 A1 | 1/2012 | Kant et al. |
| 2013/0265884 A1 | 10/2013 | Brombal et al. |
| 2014/0064209 A1* | 3/2014 | Anchan ................ H04W 76/25 370/329 |
| 2016/0157164 A1 | 6/2016 | Lee et al. |
| 2017/0289019 A1* | 10/2017 | Faccin ................ H04L 12/6418 |
| 2019/0058997 A1* | 2/2019 | Futaki ................... H04W 36/26 |
| 2020/0053803 A1* | 2/2020 | Youn ..................... H04W 76/10 |

OTHER PUBLICATIONS

Nokia et al., "Interim agreements on KI 18: Interworking and migration", SA WG2 Meeting #118, Nov. 14-18, 2016, S2-167075, 4 pages.

NTT Docomo, "Clarifications to interworking solutions", SA WG2 Meeting #118bis, Jan. 16-20, 2017, S2-170265, 8 pages.

Samsung, "Interworking between NextGen Core and EPC", SA WG2 Meeting #116BIS, Aug. 29-Sep. 2, 2016, S2-164670, 10 pages.

Nokia et al., "23.501: permanent subscriber identifier; DNN versus APN", SA WG2 Meeting #118BIS, Jan. 16-20, 2017, S2-170153, 3 pages.

Supplementary European Search Report dated Jul. 3, 2020 in connection with European Patent Application No. 18 74 1066, 8 pages.

* cited by examiner

METHOD AND APPARATUS FOR INTERWORKING BETWEEN NETWORKS IN WIRELESS COMMUNICATION SYSTEM

CROSS-REFERENCE TO RELATED APPLICATIONS

This application is a 371 of International Application No. PCT/KR2018/000809 filed on Jan. 17, 2018, which claims priority to Korean Patent Application No. 10-2017-0008345 filed on Jan. 17, 2017, Korean Patent Application No. 10-2017-0019650 filed on Feb. 13, 2017, and Korean Patent Application No. 10-2017-0024409 filed on Feb. 23, 2017, the disclosures of which are herein incorporated by reference in their entirety.

BACKGROUND

1. Field

The disclosure relates to a wireless communication system, and more particularly, to a method and an apparatus for interworking between networks in a wireless communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LIE System."

Implementation of the 5G communication system in ultra-high frequency (mmWave) bands, e.g., 28 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, in the case of performing cooperative communication through interworking between the previous 4G and 5G, an interworking system with dependency between respective networks has been performed as a non-standalone mode.

In such a case, there have been problems that separate interface and processing are necessary between 4G and 5G base stations.

The disclosure has been made in order to solve the above-described problems, and the disclosure provide a method and an apparatus for performing interworking without dependency between a 4G network and a 5G network.

SUMMARY

In an aspect of the disclosure in order to solve the above-described problems, a method by a terminal for performing communication in a wireless communication system, includes performing an access procedure to a first wireless network; performing an access procedure to a second wireless network; and performing communication for the same service through the first wireless network or the second wireless network in accordance with a wireless link state of the first wireless network and the second wireless network.

In another aspect of the disclosure, a communication method by a gateway in a wireless communication system, includes configuring a PDN connection for an APN to provide the same service to a certain terminal through a first wireless communication network or a second wireless network; and providing a service through the PDN connection for the APN to the terminal based on a wireless link state between the terminal and the first wireless communication network or a wireless link state between the terminal and the second wireless communication network.

In still another aspect of the disclosure, a terminal for performing communication in a wireless communication system, includes a transceiver configured to transmit and receive signals; and a controller configured to control to: perform an access procedure to a first wireless network, perform an access procedure to a second wireless network, and perform communication for the same service through the first wireless network or the second wireless network in accordance with a wireless link state of the first wireless network and the second wireless network.

In still another aspect of the disclosure, a gateway device for performing communication in a wireless communication system, includes a transceiver configured to transmit and receive signals; and a controller configured to control to: configure a PDN connection for an APN to provide the same service to a certain terminal through a first wireless communication network or a second wireless network, and provide a service through the PDN connection for the APN to the terminal based on a wireless link state between the terminal and the first wireless communication network or a wireless link state between the terminal and the second wireless communication network.

In still another aspect of the disclosure, a method by a terminal for performing communication in a wireless communication system, includes transmitting and receiving data with a first wireless network; performing an access procedure to a second wireless network; generating a packet data network (PDN) connection based on a gateway and a signaling identifier; and transmitting, to the gateway, a message indicating switching from the first wireless network to the second wireless network.

According to embodiments of the disclosure, an interworking system without dependency between a legacy 4G network and a 5G network is provided, and through this, 5G service launch and development can be performed quickly and conveniently. Further, if UE requires a PDN connection having the same access point name (APN) (e.g., Internet APN) for a user data service with respect to 4G and 5G, a 5G GW can allocate the same IP address to the UE and it can support a seamless service between 4G and 5G through session binding between 4G and 5G. Further, in a mobile environment, stability of a 5G radio link using mmWave may be lowered, and even in such an environment, a 4G fallback can be quickly performed in order to secure stability of the service.

DETAILED DESCRIPTION

Figure 1:
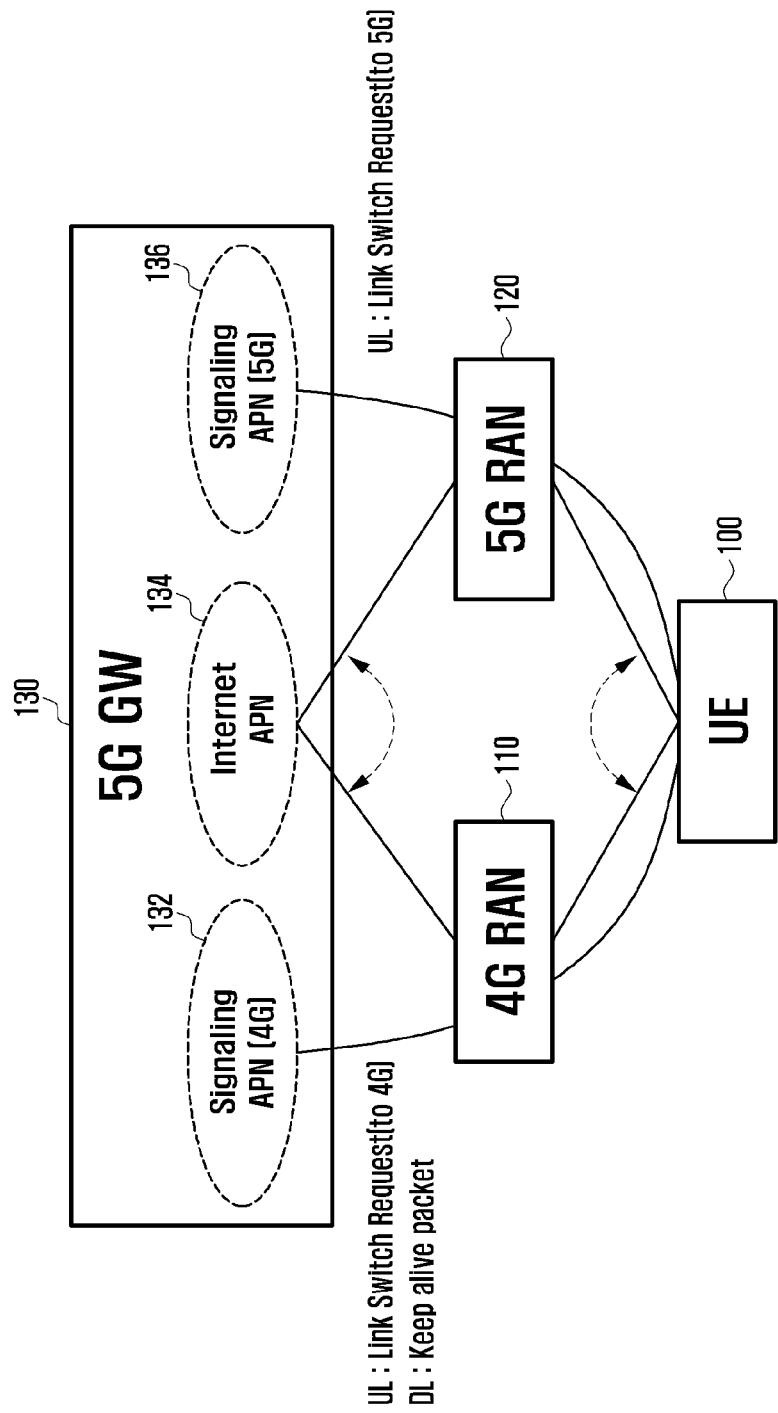
FIG. 1 is a diagram illustrating the concept of interworking between networks based on a standalone mode according to an embodiment of the disclosure.

Hereinafter, preferred embodiments of the disclosure will be described in detail with reference to the accompanying drawings. In the accompanying drawings, it is to be noted that the same drawing reference numerals are used for the same elements. Further, detailed explanation of known functions and configurations that may obscure the subject matter of the disclosure will be omitted.

In explaining the embodiments of the disclosure, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Embodiments of the disclosure described hereinafter relate to interworking without dependency between a first wireless communication system and a second wireless communication system. In an embodiment of the disclosure described hereinafter, the first wireless communication system is exemplified as 4G, and the second wireless communication system is exemplified as 5G, but the wireless communication systems are not limited thereto.

In this case, 4G may mean long term evolution (LTE), and 5G may means a communication network implemented in ultrahigh frequency (mmWave) bands, e.g., 28 GHz bands.

The existing 4G base station, core name, and interface name have been quoted as 5G base station, core name, and interface name, respectively, but in the 5G and post-5G standards, the 5G base station, the core name, and the interface name may be changed although the basic functions thereof are the same.

In the case of using an interworking system with dependency between a 4G network (hereinafter, interchangeably used with 4G) and a 5G network (hereinafter, interchangeably used with 5G), the following problems occur. It is necessary to correct and develop separate interface and procedure with respect to the existing 4G base station. This may cause a risk that the commercially operating 4G base station should be corrected and developed. Further, according to the existing technology, network based switching (in particular, it may be base station based switching) is performed, and according to the structure therefor, it is difficult to achieve a fallback to 4G through a quick detection when a radio link failure (RLF) occurs in a 5G radio link. The disclosure has been made to solve the above-described problems.

FIG. 1 is a diagram illustrating the concept of interworking between networks based on a standalone mode according to an embodiment of the disclosure.

The disclosure introduces an interworking system without dependency between a legacy 4G network and a 5G network. Specifically, user equipment (UE, which can be used interchangeably with terminal or user device) 100 independently performs non-access stratum (NAS) operations, such as registration, attach, service request, and mobility, in 4G and 5G networks. Further, the UE supports an inter-RAT switching function between 4G and 5G through a common APN at a core level of a network. Through this, if service names (e.g., Internet APN 134) requested respectively using 4G and 5G are the same, it is possible to transmit user data through 4G or 5G.

Further, if the UE requires PDN connection having the same APN (e.g., Internet APN 134) with respect to 4G and 5G, a 5G gateway (GW) 130 performs the same IP address allocation and session binding between 4G and 5G with respect to the UE to support a seamless service between 4G and 5G.

Further, stability of a 5G radio link using mmWave may be lowered in a mobile environment, and even in such an environment, 4G fallback can be quickly performed in order to secure the stability of services. As a possible method, the UE capable of determining the radio state most quickly performs link switch decision between 4G and 5G, and in order to match switching synchronization with an anchor in the 5G GW (hereinafter, interchangeably used with GW), the UE transmits a signaling message (e.g., link switch request) to the anchor in the GW. Further, in order to quickly perform a 4G fallback, the GW may maintain a 4G connection by transmitting a keep alive message to the UE through the 4G connection even in a state where a 5G connection is in use. In this case, the link switch request message and the keep alive message may be transmitted and received through generation and utilization of the PDN connection (hereinafter, interchangeably used with the signaling APN) for separate signaling APN 132 and 136 so that there is no implementation impact in the legacy 4G network.

In the disclosure, the packet data network (PDN) means an independent network (e.g., 5G network) in which a server providing the services is located, and the access point name (APN) is the name of an access point managed by the network and it indicates the name (character string) of the corresponding PDN. Based on the name of the access point, the corresponding PDN for data transmission and reception is determined.

The signaling APN disclosed in the disclosure may be understood as an identifier for generating a PDN connection for signaling, and the UE, 5G GW, and 4G and 5G HSS may pre-store predefined signaling APN therein. Further, the signaling APN may be determined between the UE and the 5G GW during an initial access. The UE and the 5G GW may transmit and receive the link switch request message, the keep alive message, and the 5G/4G link start marker packet through the PDN connection for signaling, and this may called a signaling APN bearer. In the disclosure, because the signaling APN is generated and used to transmit various kinds of signaling messages, it is possible to transmit the signaling messages between the UE and the 5G GW without changing the standard technology in the related art.

Figure 2:
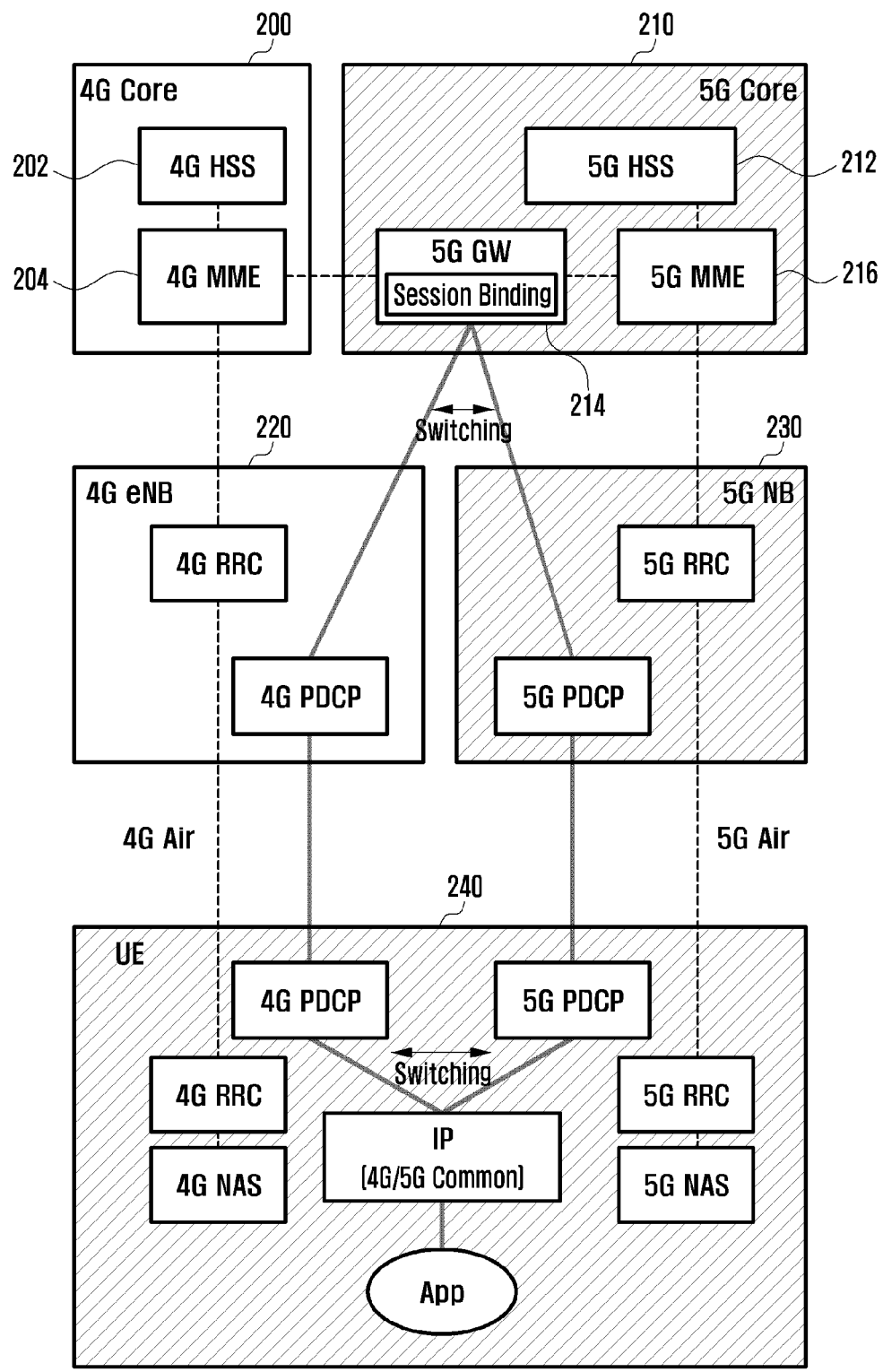
FIG. 2 is a diagram illustrating the basic configuration of an architecture for interworking between a 4G network and a 5G network according to an embodiment of the disclosure.

FIG. 2 is a diagram illustrating the basic configuration of architecture for interworking between a 4G network and a 5G network according to an embodiment of the disclosure.

The basic configuration of the 4G-5G interworking architecture is as follow. A 4G core 200 includes a mobility management entity (MME) 204 based on 4G standards and a home subscriber server (HSS) 202 based on 4G standards. A 5G core 410 includes an HSS 212 based on 5G standards, an MME 216 based on 5G standards, and a 5G GW 214 supporting 4G-5G interworking. A 4G evolved Node B (eNB, that is interchangeably used with a base station) 220 may be an eNB based on 4G standards, a 5G Node-B 230 may be a 5G Node-B based on 5G standards, and UE 240 may support a RAT operation based on 4G and 5G standards and 4G-5G interworking.

The main features of such a 4G-5G interworking architecture are as follows. First, UE support 4G and 5G. Second, the 5G HSS operates HSS separately so as to make dual registration possible, or operates as common 4G and 5G HSS. Third, if there is a paging procedure, the 5G MME supports a mobility function, whereas if not, the 5G MME does not support the mobility function. The 5G GW additionally supports an anchor function in addition to 4G serving gateway (SGW)/PDN gateway (PGW) functions. The anchor function means dual attach to 4G and 5G networks, common IP allocation, session binding based on the allocated IP, bearer ID, and TEID, and switching between 4G and 5G. Fourth, 4G and 5G cores share the 5G GW (according to circumstances, the 4G SGW can be separately configured and operated rather than being integrated in the 5G GW). Fifth, the 4G MME, the 4G HSS, and the 4G eNB follow the 4G standards and they have no changed items.

The base operation of the 4G-5G interworking using the architecture as described above is as follows. The UE performs registration/attach independently of 4G and 5G. If the UE enters into a 5G coverage, the 5G connection is generated, and user traffic is transmitted through the 5G network. If the UE gets out of the 5G coverage, the 5G connection is released, and the connection falls back to the 4G network. In this case, the user traffic is transmitted to 4G. The UE determines link switching between 4G and 5G based on the radio condition. The 5G GW supports the link switching, and the UE generates the signaling APN for 4G and 5G networks in order to match synchronization of the link switching between the UE and the 5G GW.

According to the disclosure, the operation mode of the 4G-5G interworking may be divided into two kinds as follows.

First, if a mobile originated (MO) or mobile terminated (MT) data service is generated, a dependent 4G-5G RRC state mode is a mode in which existence/nonexistence of 5G is determined always after 4G is connected. That is, the 5G connection is not triggered in a state where the 4G connection is not maintained. If normal data transmission/reception is not possible due to radio problems in 5G during the operation in the corresponding mode, quick fallback to 4G is possible because the 4G connection is maintained. In addition, if 5G connection triggering is necessary in accordance with a 5G connection triggering condition, the terminal attempts the 5G connection after turning on a 5G modem, and thus power saving effects can be obtained in comparison with cell searching through always turning on the 5G modem.

Second, an independent 4G-5G RRC state mode is a mode in which 4G and 5G connections are independently performed. That is, if the MO or MT data service is generated, the 5G connection is generated in the case where 5G is available, whereas the 4G connection is generated in the case where only 4G is available. In contrast with the dependent 4G-5G RRC state mode, the UE may receive the data service through the 5G connection without the 4G connection, and if fast 4G fallback is necessary to cope with the 5G radio problem occurrence, the UE can also generate the 4G connection if needed.

Hereinafter, with reference to FIGS. 3 and 4, the dependent and independent 4G-5G RRC state modes are dividedly described in accordance with respective circumstances.

Figure 3:
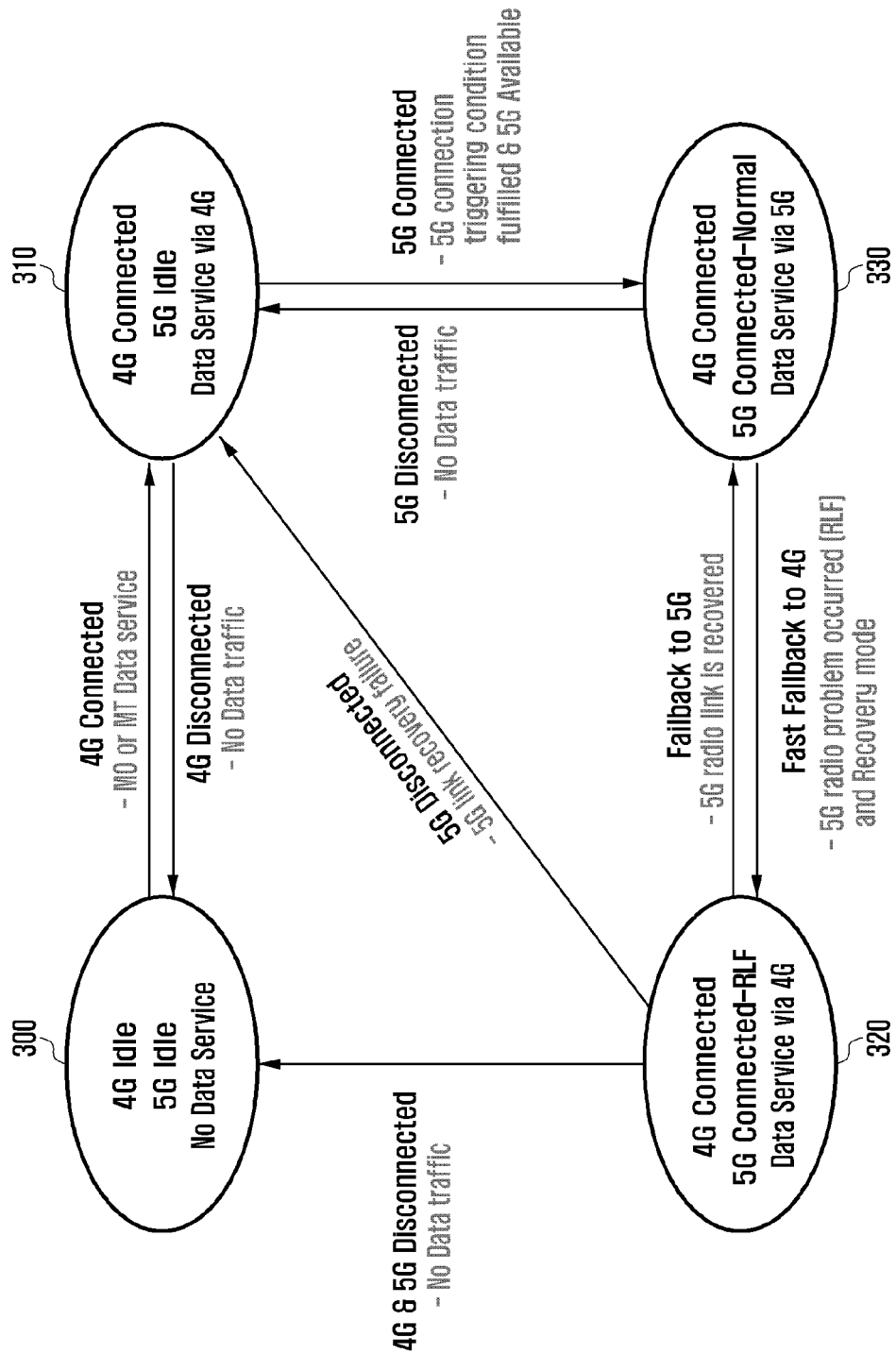
FIG. 3 is a diagram illustrating a detailed operation scenario in accordance with a situation of a dependent 4G-5G RRC state mode.

FIG. 3 is a diagram illustrating a detailed operation scenario in accordance with a situation of a dependent 4G-5G RRC state mode.

The reference numeral "300" denotes a 4G idle and 5G idle state, and in this case, a 4G operation scenario during 5G zone detection is as follows. The UE may determine whether it exists in a 5G zone through a specific public land mobile network (PLMN) or a tracking area (TA) broadcasted from a 4G base station, and if it is determined that the UE attaches to a 4G network regardless of a specific area, or the UE exists in the 5G zone, the UE generates a 4G signaling APN. In this case, if the UE gets out of the 5G zone, the 4G signaling APN may be maintained or may be released if necessary. Further, the UE performs a connection setup through 4G if the MO or MT user data is generated.

The reference numeral "310" denotes a 4G connected and 5G idle state, and a switching process from an initial 4G to a 5G is as follows. If the UE satisfies a 5G connection triggering condition, the UE activates a 5G modem, and it periodically checks 5G availability. The 5G connection triggering condition may be whether the UE has recognized that a 5G zone exists, whether a data bearer exists, whether to transmit user data, and/or whether the state is a 4G RRC connected state, and the terminal attempts the 5G connection if one or more conditions are satisfied (e.g., a state where existence of the 5G zone is recognized, or a state where existence of the 5G zone is recognized and the data bearer exists may be used as the 5G connection triggering condition). If 5G is available, the UE performs 5G RRC connection setup (this may include an attach or a service request). At the same time, if the 5G signaling APN is not generated (e.g., during an initial attach), the UE also generates the 5G signaling APN. If the 5G RRC connection setup is completed, the UE transmits, to the GW, a 5G link start marker packet for requesting switching from 4G to 5G through the 5G signaling APN bearer. The GW having received the packet transmits and receives data through a 5G link.

The reference numeral "330" denotes a 4G connected and 5G connected state, and a method for maintaining a 4G connection in a 5G active state is as follows. The terminal transmits a 5G link start marker to the GW, and the GW can be aware of whether to transmit a keep alive packet non-explicitly through reception of the corresponding message itself or explicitly through a fast fallback flag in the corresponding message. The GW may receive the 5G link start marker transmitted by the UE, perform switching to 5G, and then periodically transmit the keep alive packet (this may be a dummy packet) to the terminal through the 4G signaling APN bearer (however, the keep alive packet transmission period is made to be shorter than an inactivity timer of the 4G base station). This is effective in always preparing the 4G network in order to quickly perform the 4G fallback. In contrast, if the GW receives the 4G link start marker, it interrupts transmission of the keep alive packet.

The reference numeral "320" denotes a state where an RLF is generated in a 4G connected and 5G connected state, and in this case, operations to be performed are as follows. If a 5G radio problem is decided, or a 5G RRC connection is released, the UE performs switching from 5G to 4G, and it transmit a 4G link start marker packet for requesting switching from 5G to 4G to the GW through the 4G signaling APN bearer. The GW having received the corresponding packet transmits and receives data through the 4G link. If the 5G base station first releases the RRC connection in a state where the UE does not recognize the same, the GW may buffer or discard the data until the UE requests switching from 5G to 4G, and may wait for reception of the 4G link start marker.

Further, in the 320 state, the UE may perform switching from 5G to 4G, and if 5G is available after a specific time (i.e., 5G retry waiting time), the UE may reattempt the 5G connection setup. If the reattempt has succeeded, the 320 state is changed to the 330 state. This function is possible through setting of a 5G retry waiting timer, and the reason why the specific time is set is to prevent a ping-pong phenomenon between 4G and 5G. If necessary, the timer function may be turned off. The 5G retry waiting timer may start at a time when the 5G radio problem is detected while a data service is performed. If recovery of the 5G connection has failed to be in a 5G disconnected state after the timer expiration, but the existing or another 5G cell is available, the UE attempts 5G reconnection, that is, the UE performs switching from 4G to 5G through the 5G connection setup, and it transmits the 5G link start marker packet for requesting switching from 4G to 5G to the GW through the 5G signaling APN bearer. In particular, if the 5G link is recovered and 5G returns in a normal connected state at a time when the 5G retry waiting timer expires, the UE may be directly switched to the normal recovered 5G without reattempting a separate 5G connection setup.

However, the above-described series of processes including the 5G cell searching, reconnection attempt, and switching may be performed only in the case where the 5G connection triggering condition is satisfied.

Figure 4:
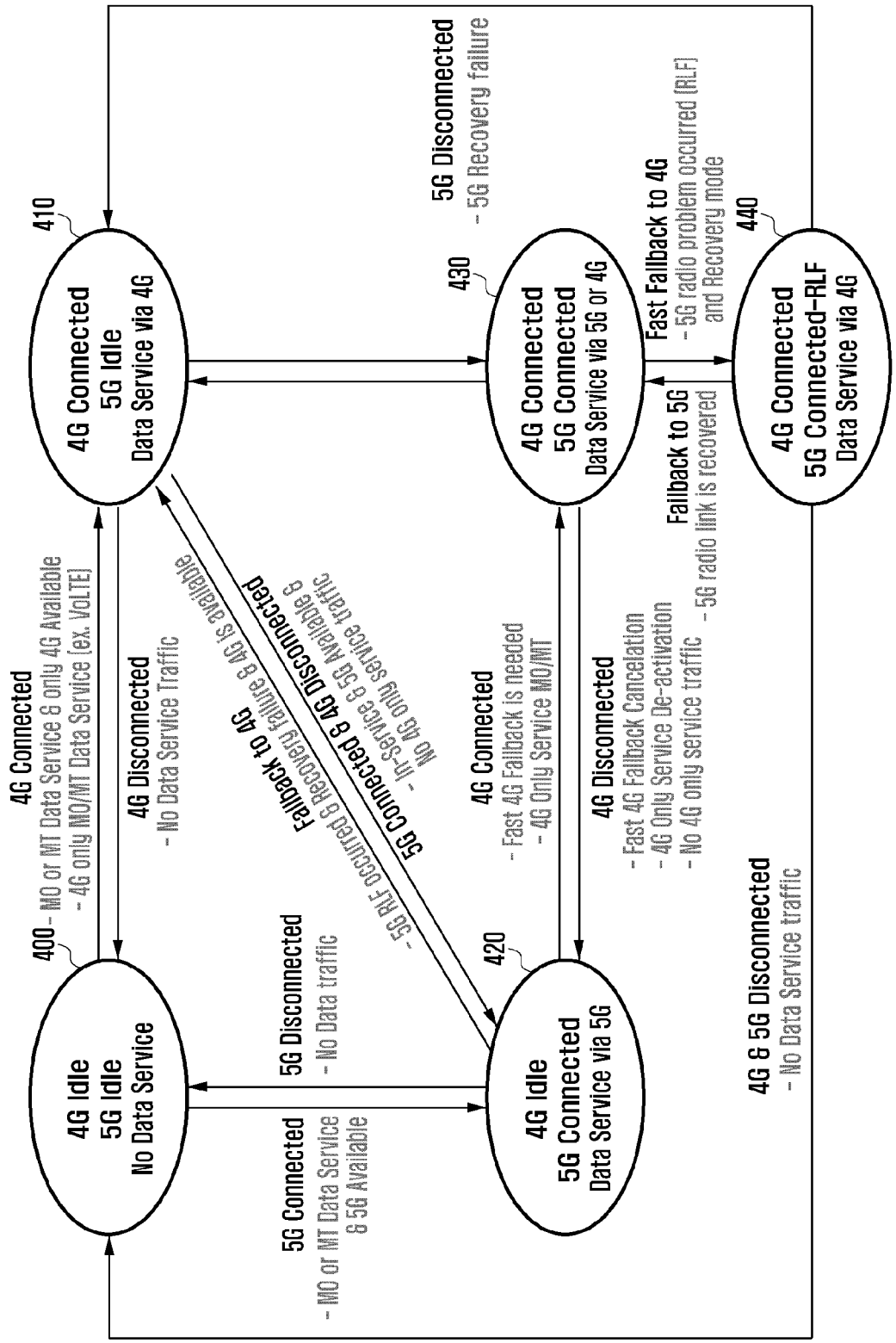
FIG. 4 is a diagram illustrating a detailed operation scenario in accordance with a situation of an independent 4G-5G RRC state mode.

FIG. 4 is a diagram illustrating a detailed operation scenario in accordance with a situation of an independent 4G-5G RRC state mode.

The reference numeral "400" denotes a 4G idle and 5G idle state, and in this case, the UE operates as follows. The UE determines whether it exists in a 5G zone through a specific PLMN or a tracking area (TA) broadcasted from a 4G base station. If it is determined that the UE attaches to a 4G network regardless of a specific area, or the UE exists in the 5G zone, the UE may generate a 4G signaling APN. Even if the UE gets out of the 5G zone, the 4G signaling APN may be maintained or may be released if necessary.

If a 5G cell is available in the 5G zone and the 5G signaling APN is not generated (e.g., during an initial 5G attach), the UE may generate the 5G signaling APN. If a MO/MT data service is generated, the 5G network is not available, and only the 4G network is available, the UE is changed from the 4G attach or idle state to an active state. If the MO/MT data service is generated, and the 5G network is available, the UE is changed from the 5G attach or 5G idle state to the active state.

The reference numeral "410" denotes a 4G connected and 5G idle state, and in this state, a switching operation from an initial 4G to a 5G is as follows. If the UE is located in a 5G zone, and a 5G connection triggering condition (e.g., in the case of using a user data service) is satisfied, the UE checks 5G availability. If 5G is available, the UE performs a 5G RRC connection setup (this may include an attach or a service request). At the same time, if the 5G signaling APN is not generated (e.g., during an initial 5G attach), the UE may also generate the 5G signaling APN. If the 5G RRC connection setup is completed, the UE transmits, to the GW, a 5G link start marker packet for requesting switching from 4G to 5G through the 5G signaling APN bearer. The GW having received the packet transmits and receives user data with the UE through a 5G link.

The reference numeral "420" denotes a 4G idle and 5G connected state, and in this state, the GW transmits and receives the data with the UE through the 5G link, but it does not maintain the 4G connection when 5G is active. In this case, during the 4G fallback due to the 5G radio problem, latency for changing to a 4G paging process and an idle to active state may be additionally consumed. If it is determined that fast 4G fallback is necessary, the UE may request the 5G GW to transmit a keep alive packet, and through this, the UE may move to a 4G connected and 5G connected state (430).

The reference numeral "430" denotes a 4G connected and 5G connected state, and an operation of maintaining the 4G connection performed in this state when 5G is active is the same as the 330 case in the dependent 4G-5G RRC state mode.

The reference numeral "440" denotes a state where a 5G RLF is generated in a 4G connected and 5G connected state, and an operation performed in this case is the same as the 320 operation in the dependent 4G-5G RRC state mode.

Further, in the mode, recovery switching from 4G to 5G is performed in the same manner as the dependent 4G-5G RRC state mode.

For clear description, although the contents of the RRC state movement between 4G and 5G have been described on the assumption that 5G RLF has occurred, the same operation may be performed even in the case where the 4G RLF has occurred.

Hereinafter, a detailed call flow of 4G-5G interworking will be described.

First, the detailed call flow in a dependent 4G-5G RRC state mode is as follows.

Figure 5:
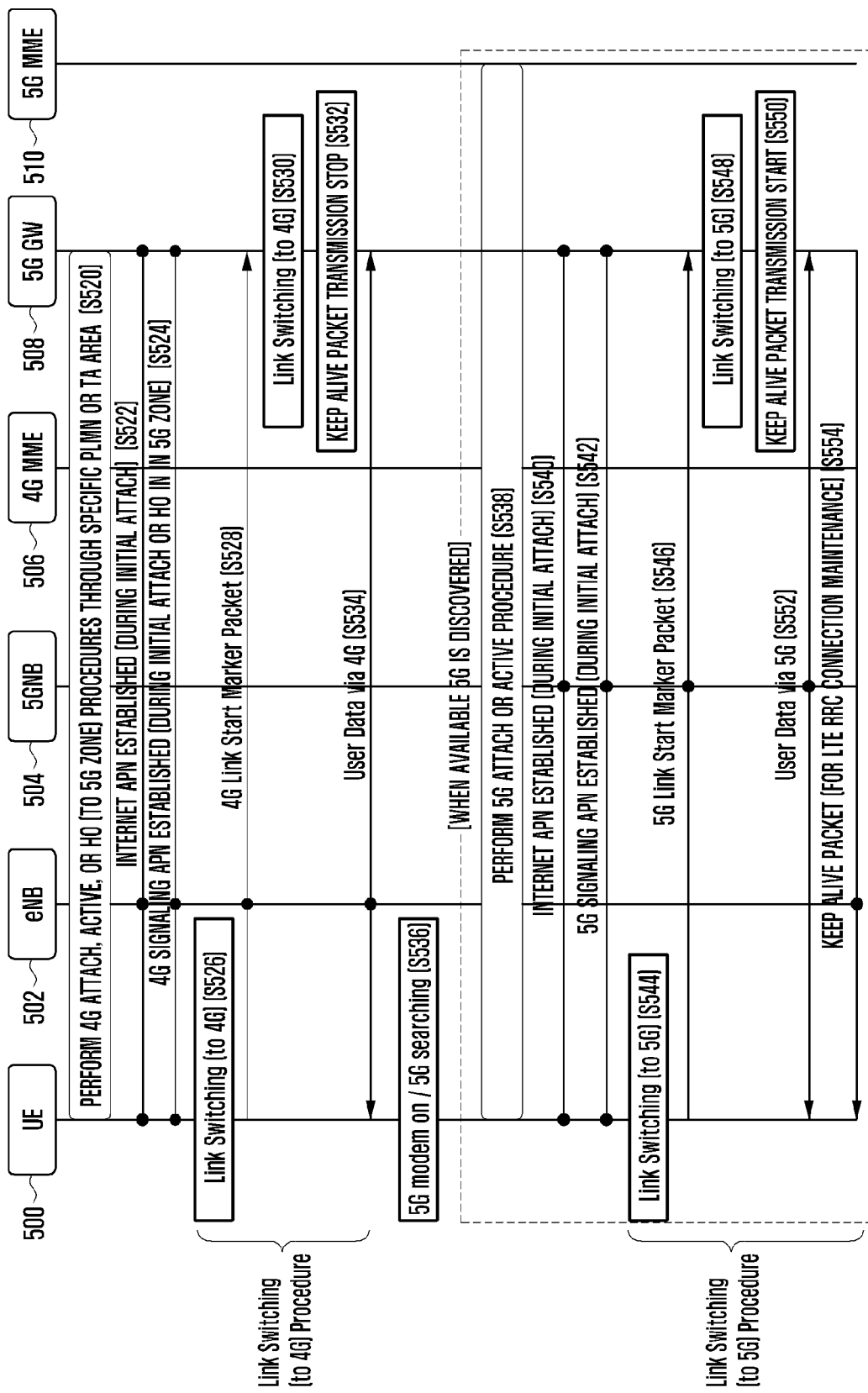
FIG. 5 is a diagram illustrating a call flow of initial 4G attach (including idle to active and handover (HO) to 5G zone operations) and initial 5G attach (including idle to active) in a dependent 4G-5G RRC state mode.

FIG. 5 is a diagram illustrating a call flow of initial 4G attach (including idle to active and handover (HO) to 5G zone operations) and initial 5G attach (including idle to active) in a dependent 4G-5G RRC state mode.

UE 500 determines whether the current location is in a 5G zone through the PLMN or the tracking area (TA) based on information broadcasted from LIE (this may be a 4G network), and if the current location is in the 5G zone, the UE 500 performs 4G attach, idle to active, or HO to 5G zone operation (S520). In the case of an initial 4G attach, an APN through a 4G link is generated (S522). An example of the APN may be the Internet APN, and this means an APN that is switched between 4G and 5G for data services.

Thereafter, the UE 500 determines that it is currently in the 5G zone based on the specific PLMN or TA, and in the case of the 4G attach in the 5G zone, in the case of the 4G attach regardless of the specific area, or in the case of handover coming into the 5G zone, the UE 500 generates a 4G signaling APN (S524). The signaling APN is an APN for 4G-5G switching control. Thereafter, if the UE 500 has not been switched to 4G, it performs link switching to 4G (S526). If the UE 500 has performed the link switching to 4G, it transmits a link start marker packet to a GW through a 4G signaling APN bearer to transfer information indicating that the link switching has been performed (S528). A 5G GW 508 perform the link switching to 4G after receiving the link start marker packet (S530). Further, if the GW transmits a keep alive packet to the 4G signaling APN bearer after the link switching to 4G, it interrupts transmission of the keep alive packet (S532). Thereafter, the UE 500 and the 5G GW 508 transmit and receive data through 4G until a 5G link is generated (S534).

If a 5G connection triggering condition (e.g., 4G RRC connected) is satisfied in a 5G zone, the UE 500 performs 5G modem-on and 5G searching operation (S536). If an available 5G is discovered, the UE performs 5G attach or 5G idle to active operation (S538). If the operation is an initial 5G attach, an APN through the 5G link is generated (S540). The APN may be the Internet APN, and the Internet APN is an APN being switched between 4G and 5G for the data services. Further, in the case of the initial 5G attach, a 5G signaling APN is generated (S542). The signaling APN is an APN for the 4G-5G switching control. The UE 500 performs switching to a 5G link after the 5G attach or idle to active procedure is completed (S544). Thereafter, the UE transmits the link start marker packet to the 5G GW 508 through the 5G signaling APN bearer to transfer the information indicating that the link switching to 5G has been performed (S546). The 5G GW 508 performs link switching from 4G to 5G during reception of the 5G link start marker packet (S548), and then starts transmission of the keep alive packet to the UE 500 in order to maintain the LIE RRC connection for the purpose of fast 4G fallback (S550). Thereafter, data transmission/reception through 5G is performed (S552), and the 5G GW 508 periodically transmits the keep alive packet to the UE 500 through the 4G signaling APN bearer in order to maintain the LTE RRC connection (S554).

Figure 6:
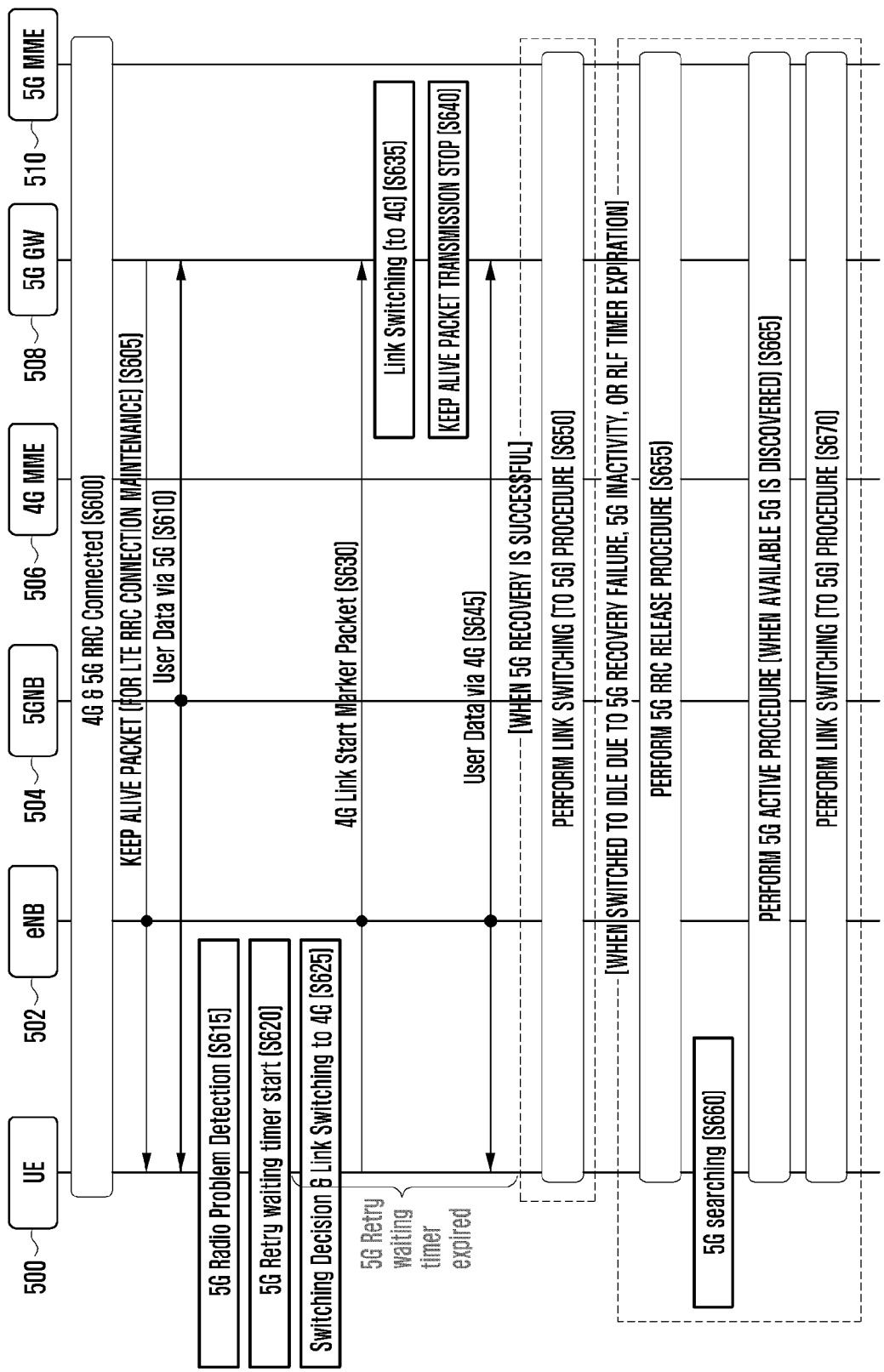
FIG. 6 is a diagram illustrating fast 4G fallback and 5G recovery procedures when a 5G radio problem occurs in a dependent 4G-5G RRC state mode.

FIG. 6 is a diagram illustrating fast 4G fallback and 5G recovery procedures when a 5G radio problem occurs in a dependent 4G-5G RRC state mode.

The UE 500 is currently in a 4G and 5G RRC connected state (S600). In this case, the 5G GW 508 periodically transmits the keep alive packet to the UE 500 through the 4G signaling APN bearer in order to maintain the LIE RRC connection for fast 4G fallback (S605). In this case, the data transmission/reception through 5G is being performed (S610).

In this case, the UE 500 detects the 5G radio problem (S615). Thereafter, the UE 500 starts a 5G retry waiting timer after detecting the 5G radio problem (S620). Thereafter, the UE 500 performs switching decision and link switching to 4G (S625). The UE 500 transmits the 4G link start marker packet to the 5G GW 508 through the 4G signaling APN in order to transfer the link switching information from 5G to 4G (S630). When the link start marker packet is received, the 5G GW 508 performs link switching from 5G to 4G (S635). Further, if the 4G link start marker packet is received, the 5G GW 508 interrupts transmission of the keep alive packet through 4G (S645).

If the 5G connection is recovered at a time when the 5G retry waiting timer expires, the UE 500 and the 5G GW 508 perform the link switching process to 5G (S650). The link switching process to 5G is the same as the operation from S544 to S554.

If the 5G recovery has failed, 5G is in an inactivity state, or 5G is switched to an idle state due to the expiration of the 5G RLF timer at the time when the 5G retry waiting timer expires, a 5G Node-B 504 perform a 5G RRC release procedure if necessary (S655). Thereafter, if the 5G connection triggering condition (e.g., 4G RRC connected) is satisfied in the 5G zone, the UE 500 starts 5G searching (S660). When the UE 500 discovers an available 5G, a 5G idle to active procedure is performed (S665). Thereafter, the UE 500 and the 5G GW 508 performs link switching to 5G (S670). The link switching process to 5G is the same as the operation from S544 to S554.

Figure 7:
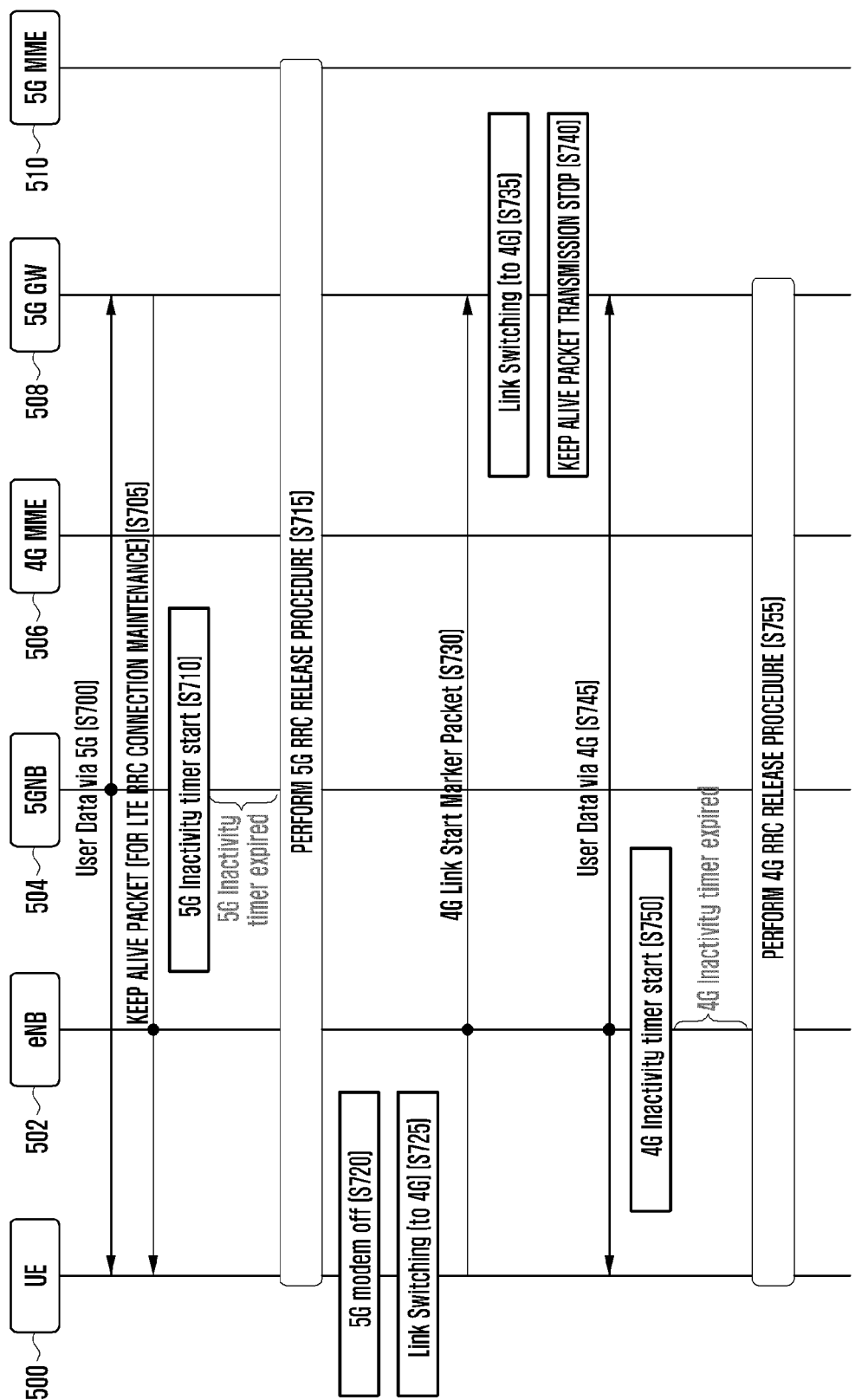
FIG. 7 is a diagram illustrating a call flow in 4G and 5G idle states in the case of no traffic in a dependent 4G-5G RRC state mode.

FIG. 7 is a diagram illustrating a call flow in 4G and 5G idle states in the case of no traffic in a dependent 4G-5G RRC state mode.

The UE 500 and the 5G GW 508 perform data transmission/reception through 5G (S700). In this case, the 5G GW 508 periodically transmits the keep alive packet to the UE 500 through the 4G signaling APN bearer in order to maintain the LTE RRC connection for fast 4G fallback during the data transmission/reception through 5G (S705).

In this case, if there is not user data, a 5G inactivity timer starts in a 5G NB 504. If the inactivity timer expires in the 5G NB 504, a 5G RRC release procedure is performed (S715). If the 5G connection triggering condition is not satisfied (e.g., if the user data does not exist), the UE 500 turns off a 5G modem (S720), and it performs link switching to 4G (S725). The UE 500 transmits a 4G link start marker packet to the 5G GW 508 through the 4G signaling APN bearer in order to transfer link switching information to 4G (S730). When the 4G link start marker packet is received, the 5G GW 508 performs link switching to 4G (S735). The 5G GW 508 interrupts transmission of the keep alive packet through 4G after performing the link switching to 4G (S740). Thereafter, data transmission/reception through 4G may be performed, or if the 5G connection triggering condition is satisfied, a 5G connection and switching process may be generated (S745).

Thereafter, if there is not the 4G link start marker packet or the user data, an eNB 502 starts the 4G inactivity timer (S750). If the inactivity timer expires, the eNB 502 performs the 4G RRC release procedure (S755).

Hereinafter, the detailed call flow in an independent 4G-5G RRC state mode is as follows.

Figure 8:
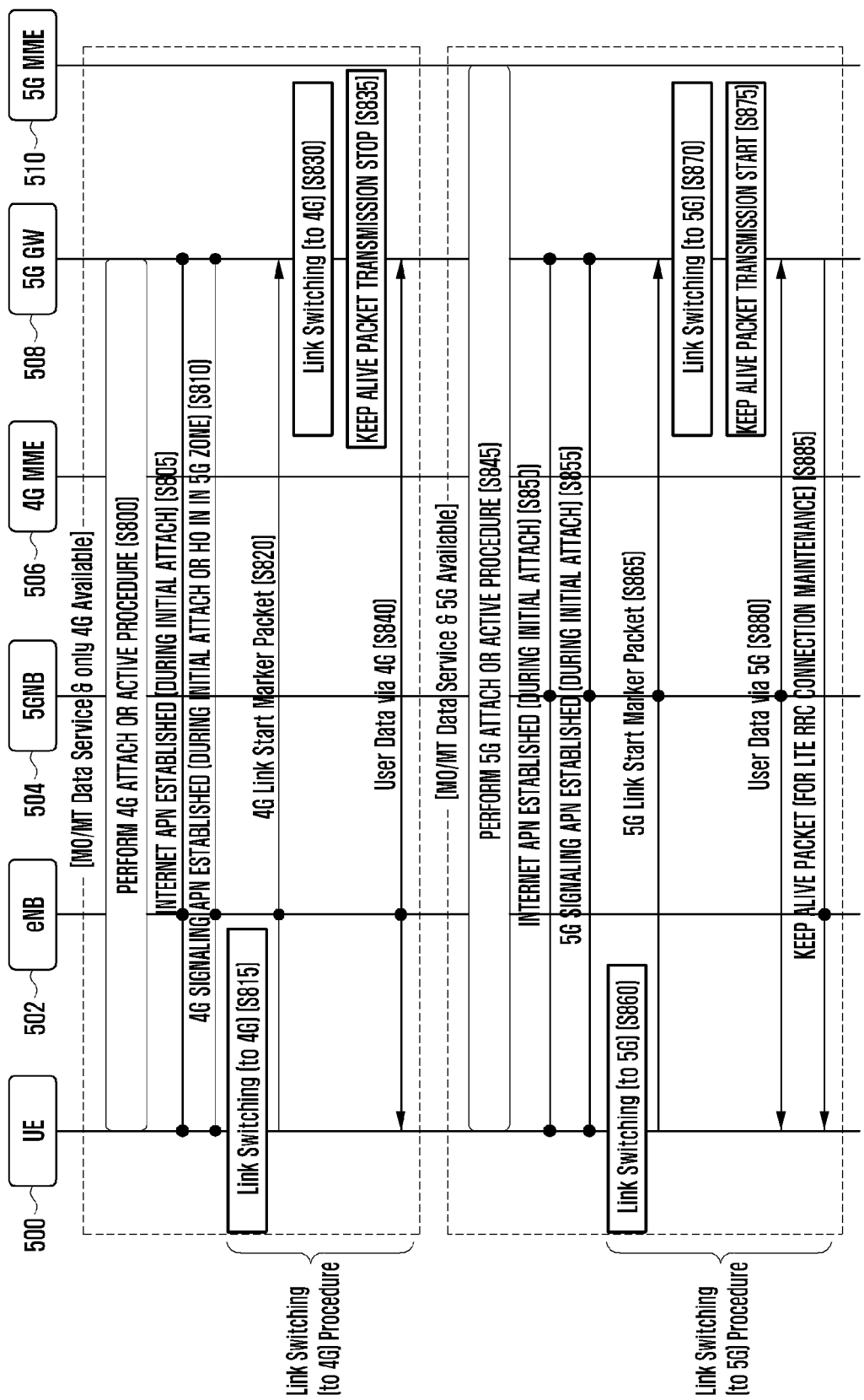
FIG. 8 is a diagram illustrating a call flow of initial 4G attach (including idle to active and handover (HO) to 5G zone operations) and initial 5G attach (including idle to active) in a dependent 4G-5G RRC state mode.

FIG. 8 is a diagram illustrating a call flow of initial 4G attach (including idle to active and HO to 5G zone) and initial 5G attach (including change to an active state) in an independent 4G-5G RRC state mode.

If a MO/MT data service is generated, the 5G network is not available, and only the 4G network is available, the UE 500 performs 4G attach or idle to active operation (S800). In the case of an initial 4G attach, an APN through a 4G link is generated (S805). The APN may be the Internet APN, and it is an APN being switched between 4G and 5G for data services.

The UE 500 determines the 5G zone based on the specific PLMN or TA, and in the case of the 4G attach or HO In in the 5G zone, a 4G signaling APN is generated (S810). Further, in the case of an LIE attach regardless of a specific area, the 4G signaling APN may be basically generated. The signaling APN is an APN for 4G-5G switching control. If switching to 4G is not performed, the UE 500 performs link switching to 4G (S815). In the case of a general initial attach, such an operation may not be necessary. After performing the link switching to 4G, the UE 500 transmits the 4G link start marker packet to the 5G GW 508 through the 4G signaling APN bearer in order to transfer information on link switching to 4G (S820). The 5G GW 508 performs the link switching to 4G when the 4G link start marker packet is received (S830). If the 5G GW 508 is transmitting the keep alive packet to 4G after performing the link switching to 4G, it interrupts transmission of the keep alive packet (S835). The data is transmitted and received through 4G until the generation of the 5G link (S840).

If the MO/MT data service is generated, the 5G network is available, the UE 500 performs a 5G attach or 5G idle to active procedure (S845). In the case of an initial 5G attach, an APN through a 5G link is generated (S850). The APN may be the Internet APN, and it is an APN being switched between 4G and 5G for data services. In the case of the initial 5G attach, the 5G signaling APN is generated (S860). The signaling APN is an APN for 4G-5G switching control.

If switching to 5G is not performed, the UE 500 performs switching to the 5G link (S860). The UE 500 transmits the link start marker packet to the 5G GW 508 through the 5G signaling APN bearer in order to transfer information on link switching to 5G (S865). The 5G GW 508 performs the link switching to 5G when the 5G link start marker packet is received (S870). If fast 4G fallback is necessary after the link switching to 5G is performed, the 5G GW 508 starts transmission of the keep alive packet in order to maintain the LTE RRC connection (S875). Thereafter, data transmission/reception through 5G is performed (S880). Thereafter, the 5G GW 508 periodically transmits the keep alive packet to the UE 500 through the 4G signaling APN bearer in order to maintain the LTE RRC connection (S885).

Figure 9:
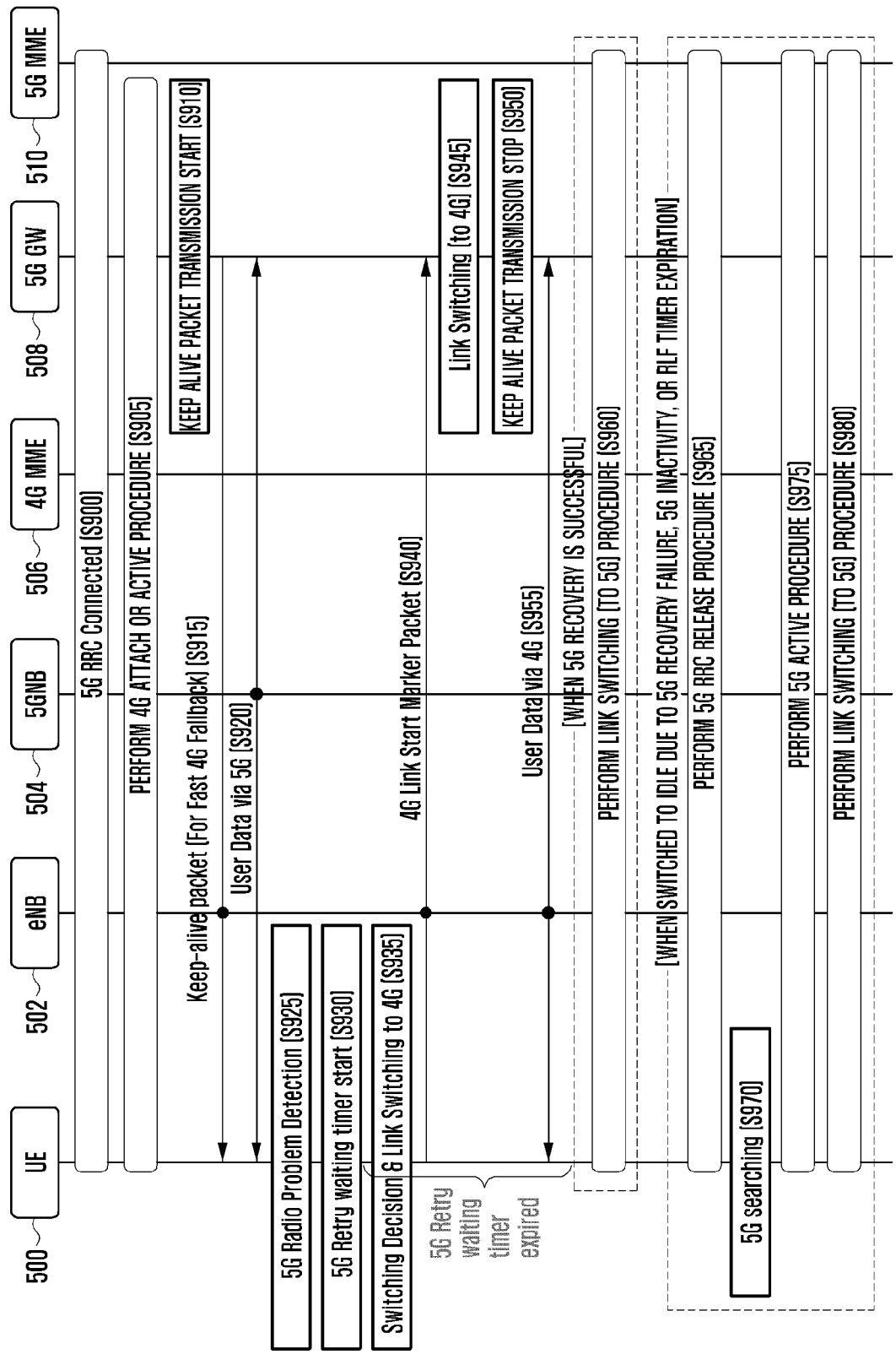
FIG. 9 is a diagram illustrating fast 4G fallback and 5G recovery processes when a 5G radio problem occurs in an independent 4G-5G RRC state mode.

FIG. 9 is a diagram illustrating fast 4G fallback and 5G recovery processes when a 5G radio problem occurs in an independent 4G-5G RRC state mode.

5G is currently in an RRC connected state, and data transmission/reception is being performed (S900). In this case, if it is determined that 4G fast fallback is necessary, UE 500 and a 4G network perform 4G attach or active (paging) procedure as a fast 4G fallback advance preparation operation in the case where 4G is in a disconnected state (S905). The 5G GW 508 starts transmission of a keep alive packet through a 4G signaling APN bearer (S910), and it periodically transmits the keep alive packet through the 4G signaling APN bearer in order to maintain the LTE RRC connection (S915). In this case, data transmission/reception through 5G is performed (S920).

If the UE 500 detects a 5G radio problem (S925), the UE 500 starts a 5G retry waiting timer (S930). The UE 500 performs switching decision and link switching to 4G (S935). The UE 500 transmits a 4G link start marker packet to the 5G GW 508 through the 4G signaling APN in order to transfer information on link switching to 4G (S940). The 5G GW 508 performs link switching to 4G when the 4G link start marker packet is received (S945), and it interrupts transmission of the keep alive packet through 4G (S950). Thereafter, data transmission/reception through 4G is performed (S955).

If the 5G connection is recovered at a time when the 5G retry waiting timer expires, link switching to 5G is performed (S960).

If the 5G recovery has failed at the time when the 5G retry waiting time expires, in the case of 5G inactivity, or if the state is switched to an idle state due to the expiration of the 5G RLF timer, a 5G Node-B 504 performs 5G RRC release procedure if necessary (S965). If a 5G connection triggering condition (e.g., 4G RRC connected) is satisfied in a 5G zone, the UE 500 starts 5G searching (S970). If an available 5G is discovered, the UE 500 performs 5G idle to active procedure (S975). Thereafter, the link switching to the 5G process is performed (S980). The link switching to the 5G process is the same as the operation from S544 to S554.

Figure 10:
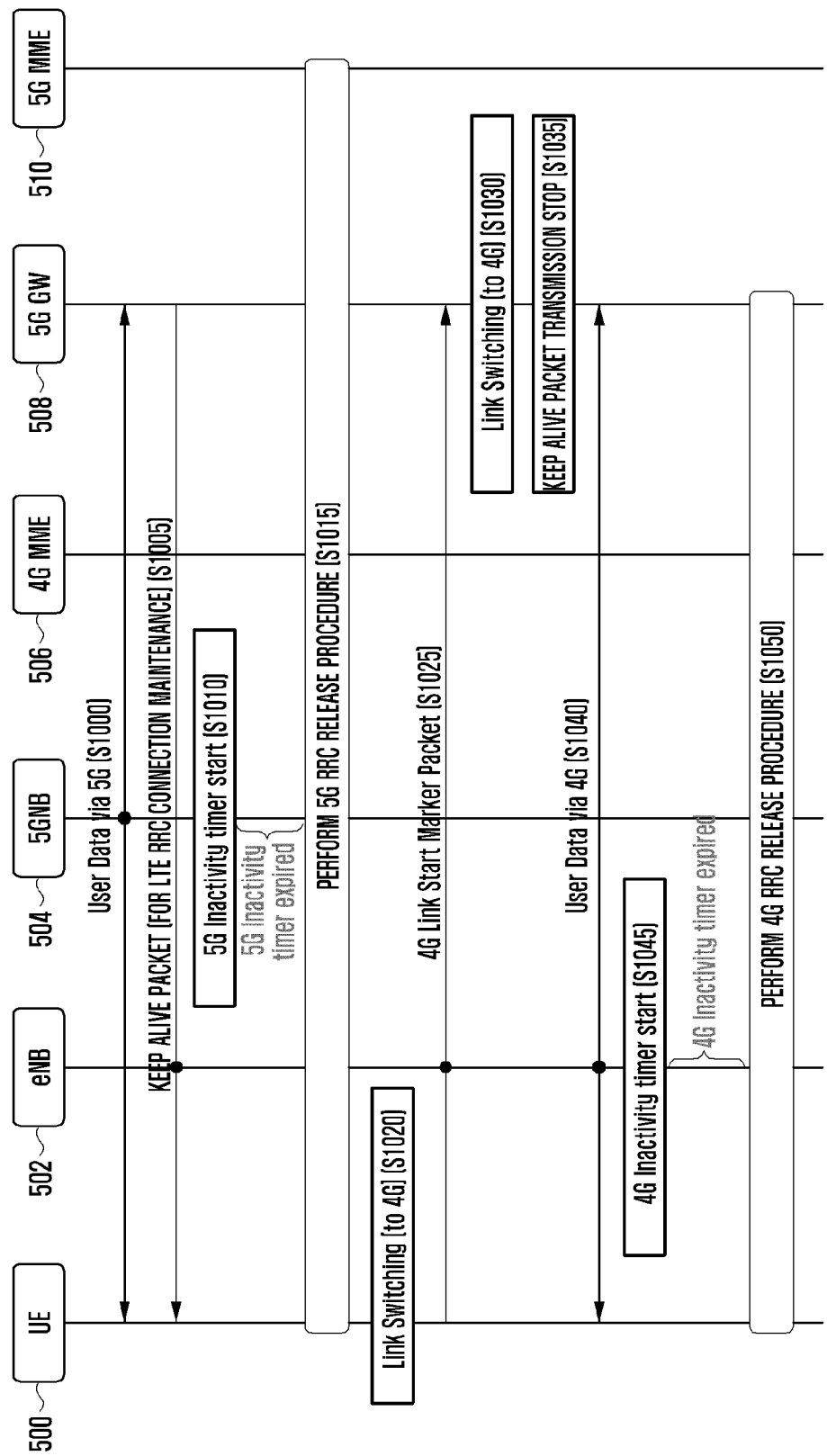
FIG. 10 is a diagram illustrating a call flow in 4G and 5G idle states in the case of no traffic in an independent 4G-5G RRC state mode.

FIG. 10 is a diagram illustrating a call flow in 4G and 5G idle states in the case of no traffic in an independent 4G-5G RRC state mode.

Data transmission/reception through 5G is currently performed (S1000). The 5G GW 508 may periodically transmit the keep alive packet to the UE 500 through the 4G signaling APN bearer in order to maintain the LTE RRC connection for fast 4G fallback during the data transmission/reception through 5G (S1005).

If there is not user data, an inactivity timer starts in a 5G NB 504. In this case, if the inactivity timer expires, a 5G RRC release procedure is performed (S1015).

The UE 500 performs link switching to 4G after the 5G RRC release (S1020), and it transmits a 4G link start marker packet to the 5G GW 508 through the 4G signaling APN bearer in order to transfer information on link switching to 4G (S1025). When the 4G link start marker packet is received, the 5G GW 508 performs link switching to 4G (S1030), and in this case, it interrupts transmission of the keep alive packet through 4G (S1035). Thereafter, data transmission/reception through 4G is performed (S1040).

Thereafter, if there is not the 4G link start marker packet or the user data, the 5G NB 504 starts the 4G inactivity timer (S1045). If the inactivity timer expires, the 5G NB 504 performs the 4G RRC release procedure (S1050).

Hereinafter, a terminal operation in a dependent 4G-5G RRC state mode will be described.

Figure 11:
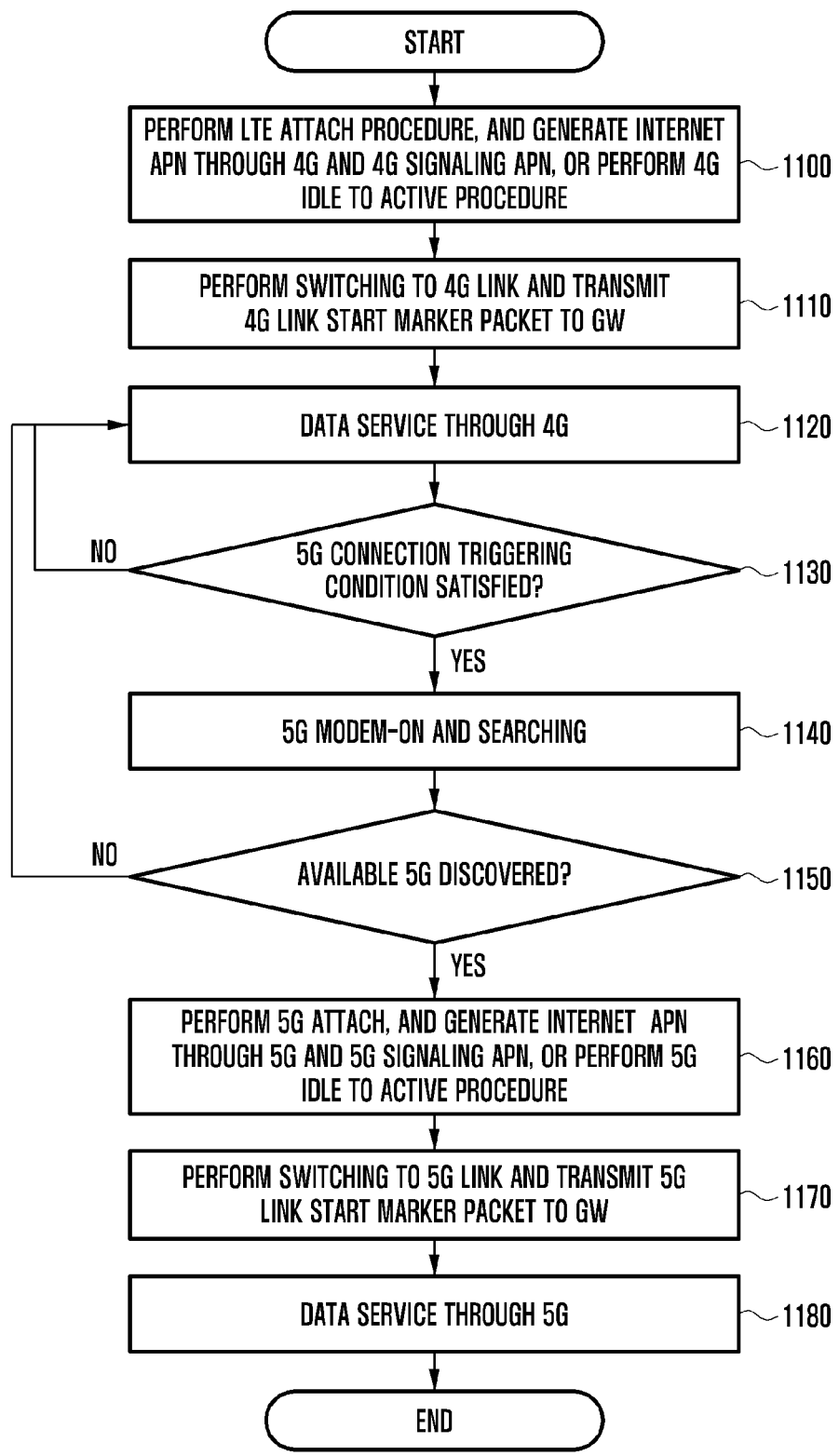
FIG. 11 is a flowchart illustrating 4G and 5G initial attach and active procedures in a dependent 4G-5G RRC state mode of a terminal.

FIG. 11 is a flowchart illustrating 4G and 5G initial attach and active procedures in a dependent 4G-5G RRC state mode of a terminal.

At operation 1100, a terminal performs an LIE attach procedure, Internet APN and 4G signaling APN generation through 4G, or a 4G idle to active procedure. At operation 1110, the terminal performs switching to a 4G link, and it transmits a 4G link start marker packet to the 5G GW. If path setup to 4G is immediately performed during an initial access, operation 1110 can be omitted. At operation 1120, a data service through 4G is performed between the terminal and a 4G base station.

At operation 1130, the terminal determines whether a 5G connection triggering condition is satisfied. The following items may be considered as the 5G connection triggering condition. First, in the case of recognizing a 5G zone through matching to a specific PLMN or TA, the terminal determines whether to perform 5G connection triggering and switching. Second, in the case of a 4G RRC connected state, the terminal determines whether to perform the 5G connection triggering and switching. Third, in the case where a basic data bearer through 4G or a specific data bearer (e.g., Internet APN) exists, the terminal determines whether to perform the 5G connection triggering and switching. Fourth, in the case where a basic user data through 4G or a specific user data (e.g., data through the Internet APN) is transmitted and received, the terminal determines whether to perform the 5G connection triggering and switching. If one or more of the 5G connection triggering conditions are satisfied, the terminal performs 5G connection attempt operation (e.g., a case where the existence of the 5G zone is recognized or a case where the data bearer exists with recognition of the existence of the 5G zone may be used as a specific 5G connection triggering condition). If the above-described condition is satisfied, the terminal turns on a 5G modem based on the 5G connection triggering condition, and through this, the terminal may perform the 5G cell searching. If an available 5G cell exists, the terminal may perform the 5G connection and switching operations. In contrast, if the condition is not satisfied, the terminal may perform 4G switching operation, and in this case, the terminal may interrupt the 5G cell searching, and it may turn off the 5G modem.

If the 5G connection triggering condition is satisfied at operation 1130, the terminal turns on the 5G modem and starts 5G cell searching at operation 1140. At operation

1150, the terminal determines whether an available 5G is discovered, and if the available 5G is not discovered, the terminal continuously performs a data service through 4G (1120), whereas if the available 5G is discovered, the terminal performs 5G attach and Internet APN and 5G signaling APN generation through 5G, or 5G idle to active procedure at operation 1160. Thereafter, at operation 1170, the terminal performs switching to a 5G link and transmits a 5G link start marker packet to the 5G GW, and at operation 1180, the terminal performs the data service through 5G.

If the 5G connection triggering condition is not satisfied at operation 1130, the terminal returns to operation 1120 and continuously performs the data service through 4G.

Figure 12:
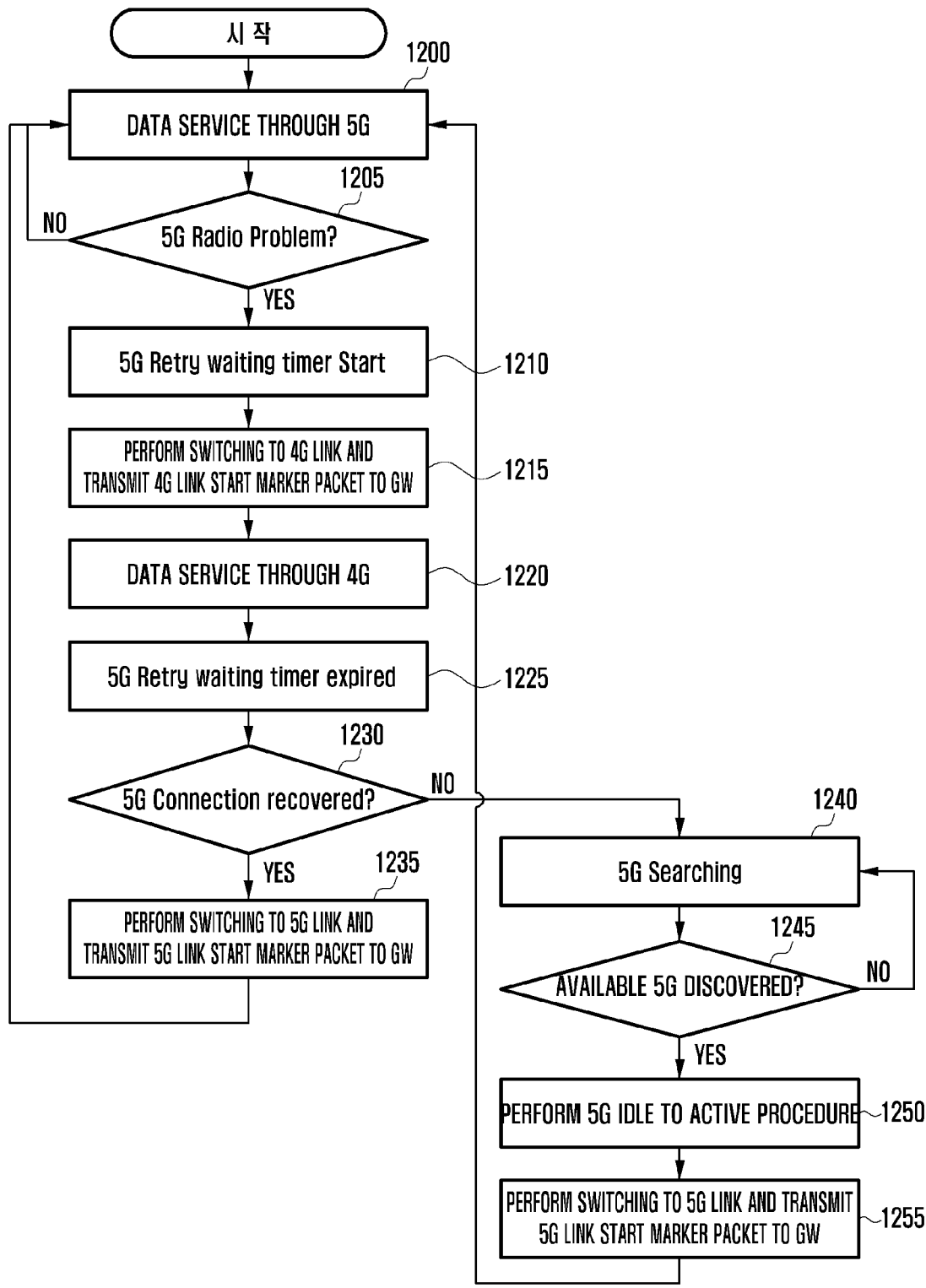
FIG. 12 is a flowchart illustrating fast 4G fallback and 5G recovery procedures when a 5G radio problem occurs in a dependent 4G-5G RRC state mode of a terminal.

FIG. 12 is a flowchart illustrating fast 4G fallback and 5G recovery procedures when a 5G radio problem occurs in a dependent 4G-5G RRC state mode of a terminal.

At operation 1200, the data service through 5G is performed. In this case, at operation 1210, the terminal determines whether the occurrence of the 5G radio problem is detected. If it is necessary to prevent a ping-pong phenomenon between 4G and 5G at operation 1210, the terminal starts the 5G retry waiting timer to adjust a re-access time of the 5G Node-B. If the 5G radio problem does not occur, the terminal returns to operation 1200.

At operation 1215 after operation 1210, the terminal performs switching to a 4G link and it transmits a 4G link start marker packet to the 5G GW. The data service through 4G is performed until the 5G retry waiting timer expires (1220). Thereafter, the 5G retry waiting timer expires (1225), and the terminal determines whether the 5G connection has been recovered (1230). If so, the terminal performs switching to the 5G link and it transmits the 5G link start marker packet to the 5G GW (1235). Thereafter, the terminal returns again to operation 1200 to perform the data service through 5G.

If it is determined that the 5G connection recovery has failed at operation 1230, the terminal starts the 5G cell searching (1240), and it determines whether an available 5G is discovered (1245). If the available 5G is not discovered, the terminal continuously performs the data service through 4G, and it performs the 5G cell searching (1240). If the available 5G is discovered, the terminal performs 5G idle to active procedure (1250). Thereafter, the terminal performs switching to the 5G link and it transmits the 5G link start marker packet to the 5G GW. Thereafter, the terminal returns to operation 1200 to perform the data service through 5G.

Figure 13:
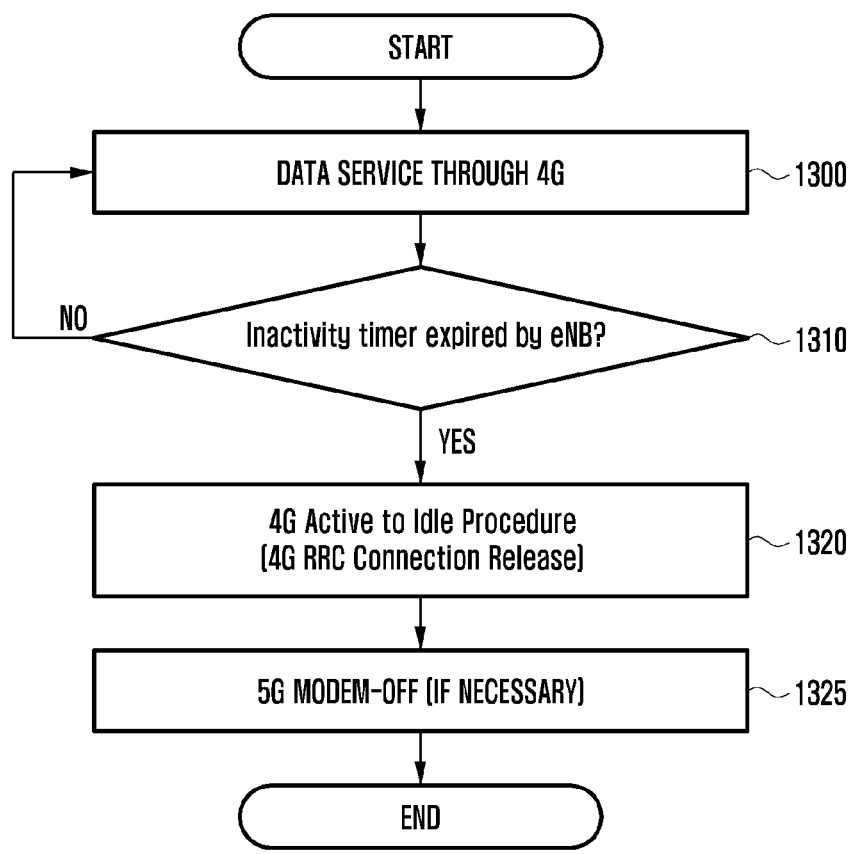
FIG. 13 is a flowchart illustrating a procedure in the case of no traffic with respect to 4G in a dependent 4G-5G RRC state mode of a terminal.

FIG. 13 is a flowchart illustrating a procedure in the case of no traffic with respect to 4G in a dependent 4G-5G RRC state mode of a terminal.

At operation 1300, a data service through 4G is performed. If user traffic exists, the data service is continuously performed, whereas if the user traffic does not exist, the 4G base station starts an inactivity timer, and the terminal determines whether the inactivity timer in the 4G base station expires at operation 1310. If the inactivity timer expires, the 4G active to idle procedure (i.e., 4G RRC connection release process) is performed at operation 1320. Thereafter, if the 5G connection triggering condition is not satisfied and the existing 5G modem-on and searching state is maintained, 5G modem-off may be performed (1325). If the inactivity timer does not expire, the terminal returns to operation 1300.

Figure 14:
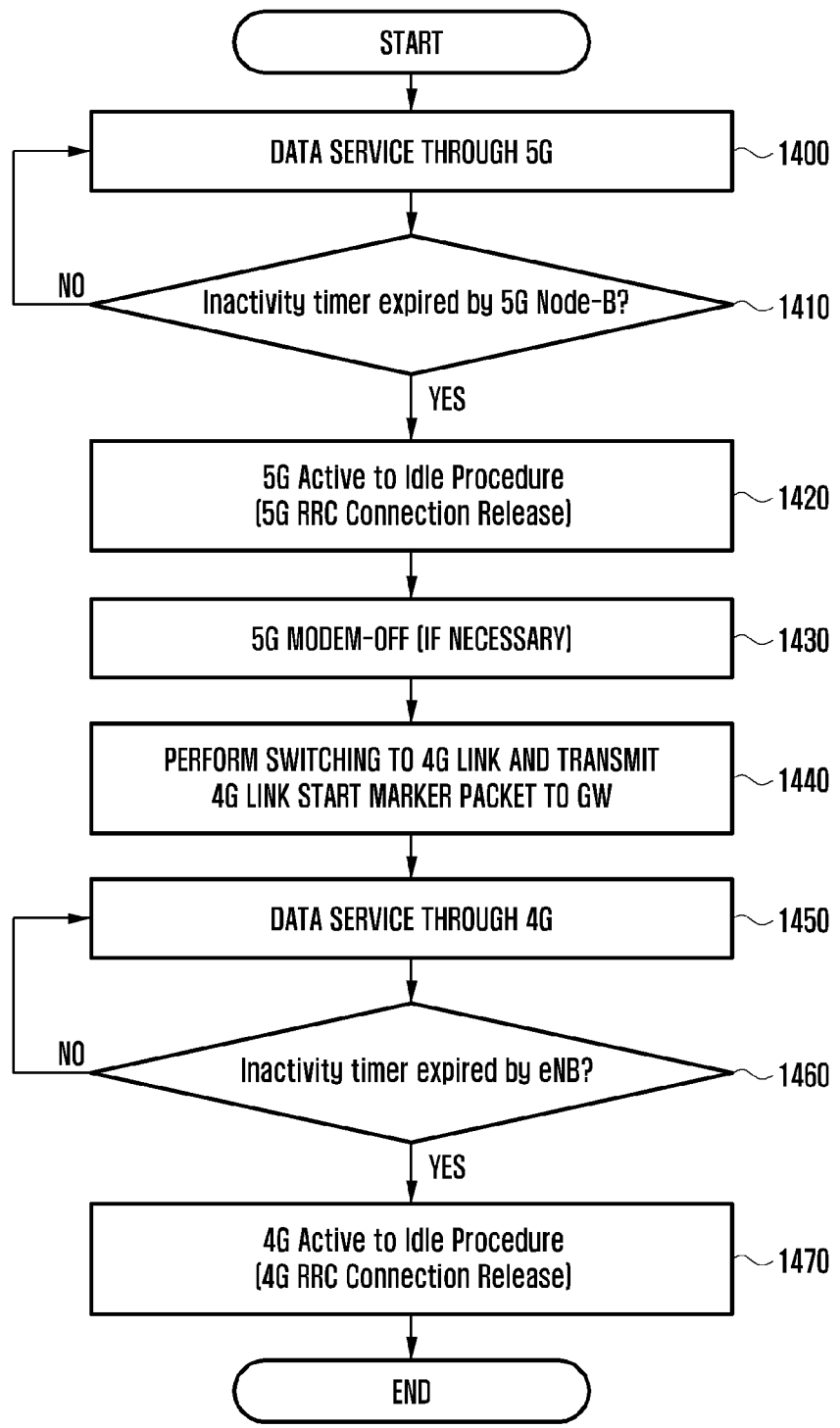
FIG. 14 is a flowchart illustrating a procedure in the case of no traffic with respect to 5G in a dependent 4G-5G RRC state mode of a terminal.

FIG. 14 is a flowchart illustrating a procedure in the case of no traffic with respect to 5G in a dependent 4G-5G RRC state mode of a terminal.

At operation 1400, a data service through 5G is performed. If user traffic exists, the data service is continuously performed, whereas if the user traffic does not exist, the 5G base station starts an inactivity timer, and the terminal determines whether the inactivity timer expires at operation 1410. If the inactivity timer expires, the 5G active to idle procedure (i.e., 5G RRC connection release process) is performed (1420). If the inactivity timer does not expire, the terminal returns to operation 1400.

If the 5G connection triggering condition is not satisfied after operation 1420, 5G modem-off may be performed (1430), and the terminal performs switching to a 4G link and it transmits a 4G link start marker packet to the 5G GW (1440). Thereafter, if necessary, the terminal performs the data service through 4G (1450), and if the user traffic exists, the data service is continuously performed, whereas if the 5G connection triggering condition is satisfied, 5G connection and switching may be performed. If the user traffic does not exist, the 4G base station starts the inactivity timer. At operation 1460, the terminal determines whether the inactivity timer in the 4G base station expires. If the inactivity timer expires, the terminal performs 4G active to idle procedure (i.e., 4G RRC connection release) (1470). If the inactivity timer does not expire, the terminal returns to operation 1450.

Figure 15:
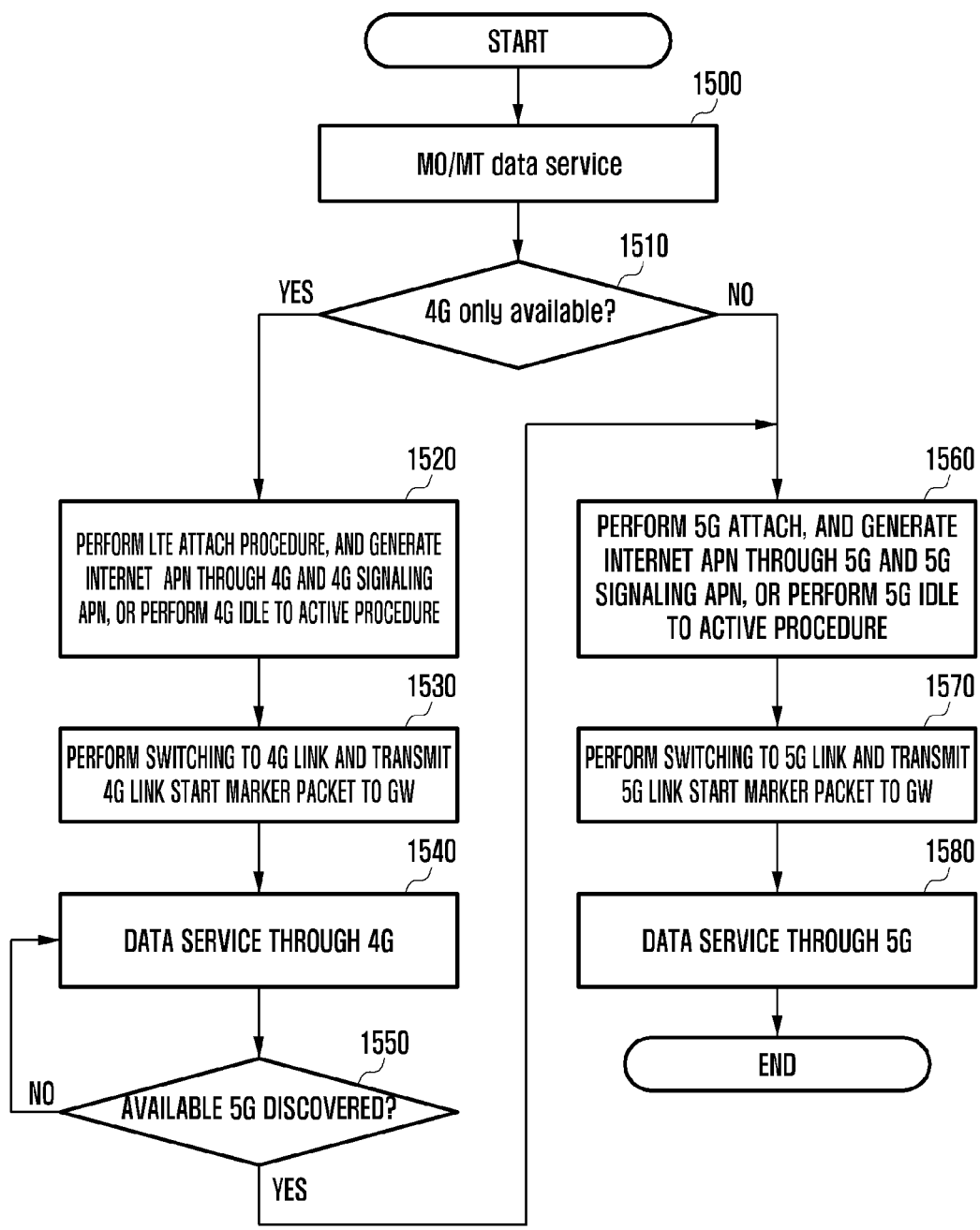
FIG. 15 is a flowchart illustrating 4G and 5G initial attach and active procedures of a terminal in an independent 4G-5G RRC state mode.

FIG. 15 is a flowchart illustrating 4G and 5G initial attach and active procedures of a terminal in an independent 4G-5G RRC state mode.

At operation 1500, MO/MT data service is generated, and at operation 1510, the terminal identifies whether only the 4G network is available. If only the 4G network is available, the terminal, at operation 1520, performs LTE attach procedure and generation of the Internet APN through 4G and 4G signaling APN, or 4G idle to active procedure. Thereafter, at operation 1530, the terminal performs switching to a 4G link, and it transmits a 4G link start marker packet to the 5G GW. If path setup to 4G is immediately performed during an initial access, operation 1530 can be omitted. Thereafter, the terminal performs a data service through 4G with the 4G base station (1540). Thereafter, the terminal determines whether the 5G network is available (1550), and if the 5G network is available, the terminal performs 5G attach and it generates the Internet APN through 5G and 5G signaling APN, or it performs 5G idle to active procedure (1560). If the 5G network is not available, the terminal, at operation 1540, continuously performs the data service. At operation 1570 after operation 1560, the terminal performs switching to the 5G link, and it transmits the 5G link start marker packet to the 5G GW. Thereafter, the terminal performs the data service through the 5G connection.

At operation 1510, if only the 4G network is not available (i.e., if the 5G network is available), the terminal performs operation 1560.

If the 5G radio problem occurs in the independent 4G-5G RRC state mode, fast 4G fallback and 5G recovery procedures are performed in the same manner as those as illustrated in FIG. 12.

The procedure in the case of no traffic with respect to 4G in the dependent 4G-5G RRC state mode is the same as that as illustrated in FIG. 13.

Next, the operation of the 5G GW (hereinafter, GW) in the dependent 4G-5G RRC state mode will be described.

Figure 16:
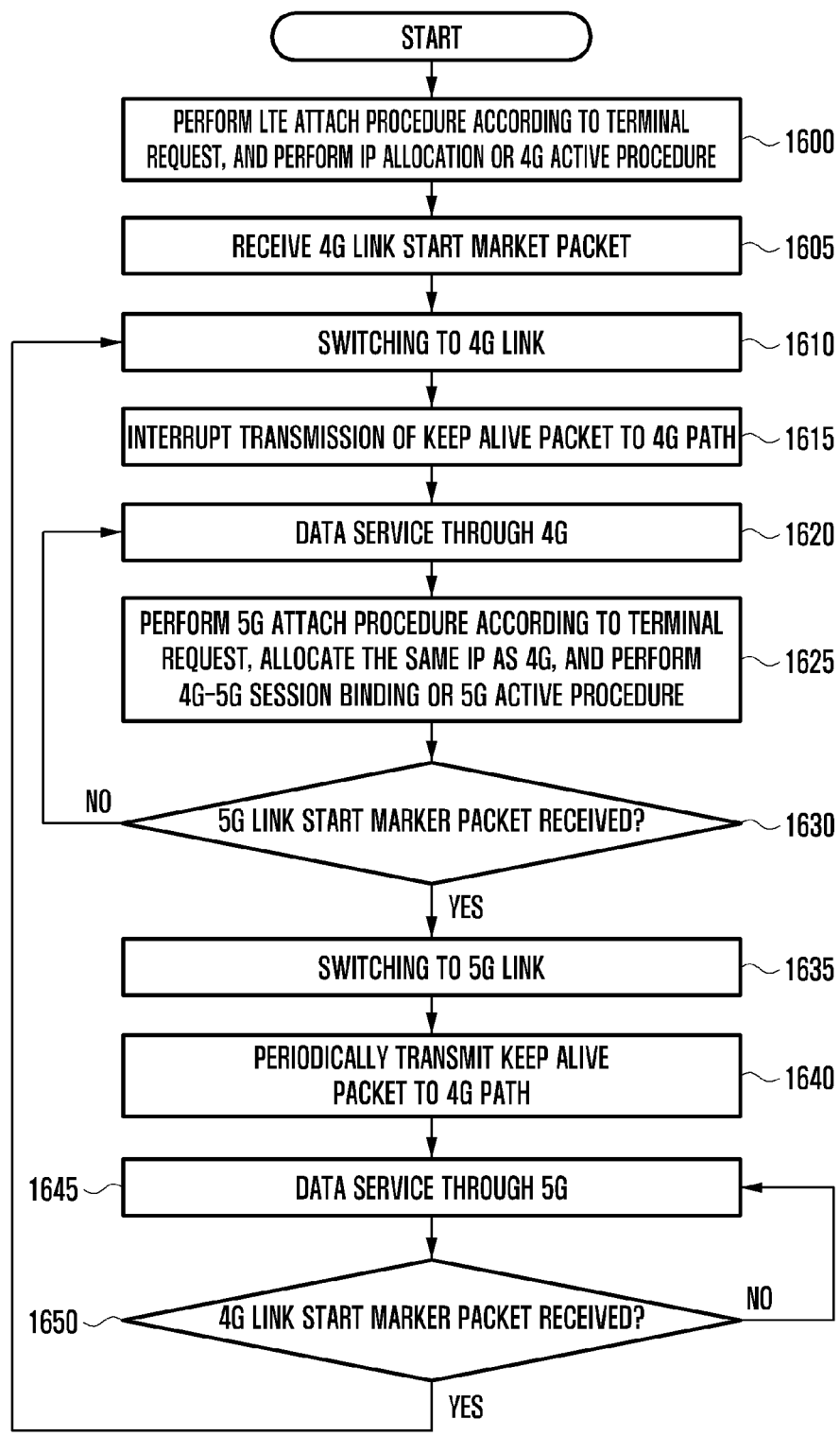
FIG. 16 is a flowchart illustrating 4G and 5G initial attach and active procedures of a GW in a dependent 4G-5G RRC state mode.

FIG. 16 is a flowchart illustrating 4G and 5G initial attach and active procedures of a GW in a dependent 4G-5G RRC state mode.

At operation 1600, the GW performs an LTE attach procedure according to a request from the terminal, generation of the Internet APN through 4G and 4G signaling APN, or an active procedure in the case where 4G is in an idle state. At operation 1605, the GW receives the 4G link start marker packet from the terminal. Thereafter, the GW performs switching to the 4G link (1610). If path setup to 4G is immediately performed during an initial access, operations 1605 and 1610 can be omitted. Thereafter, at operation 1615, if the GW pre-transmits a keep alive packet on a 4G path, it interrupts transmission of the keep alive packet. Thereafter, at operation 1620, the GW performs the data service through 4G.

Thereafter, at operation 1625, if the 5G attach has not been performed, the GW performs the 5G attach procedure according to the request from the terminal, generates Internet APN through 5G and 5G signaling APN, and performs allocation of the same IP as that of 4G and 4G-5G session binding in the performing process. Further, if 5G is in an idle state, an active procedure is performed. In other cases (e.g., if 5G is in a pre-connected state), operation 1625 can be omitted. Thereafter, at operation 1630, the GW identifies whether the 5G link start marker packet transmitted by the terminal is received. If the GW receives the 5G link start marker packet, it performs switching to the 5G link (1635). In order to maintain the 4G RRC in a connected state for the purpose of the fast 4G fallback, the GW periodically transmits the keep alive packet to the terminal through the 4G path (1640). Thereafter, the GW performs the data service through 5G. At operation 1630, if the GW does not receive the 5G link start marker packet, it returns to operation 1620 to perform the data service using 4G.

At operation 1650 after operation 1645, the GW determines whether the 4G link start marker packet is received, and if the packet is received, the GW returns to operation 1610, whereas if the packet is not received, the GW returns to operation 1645.

Figure 17:
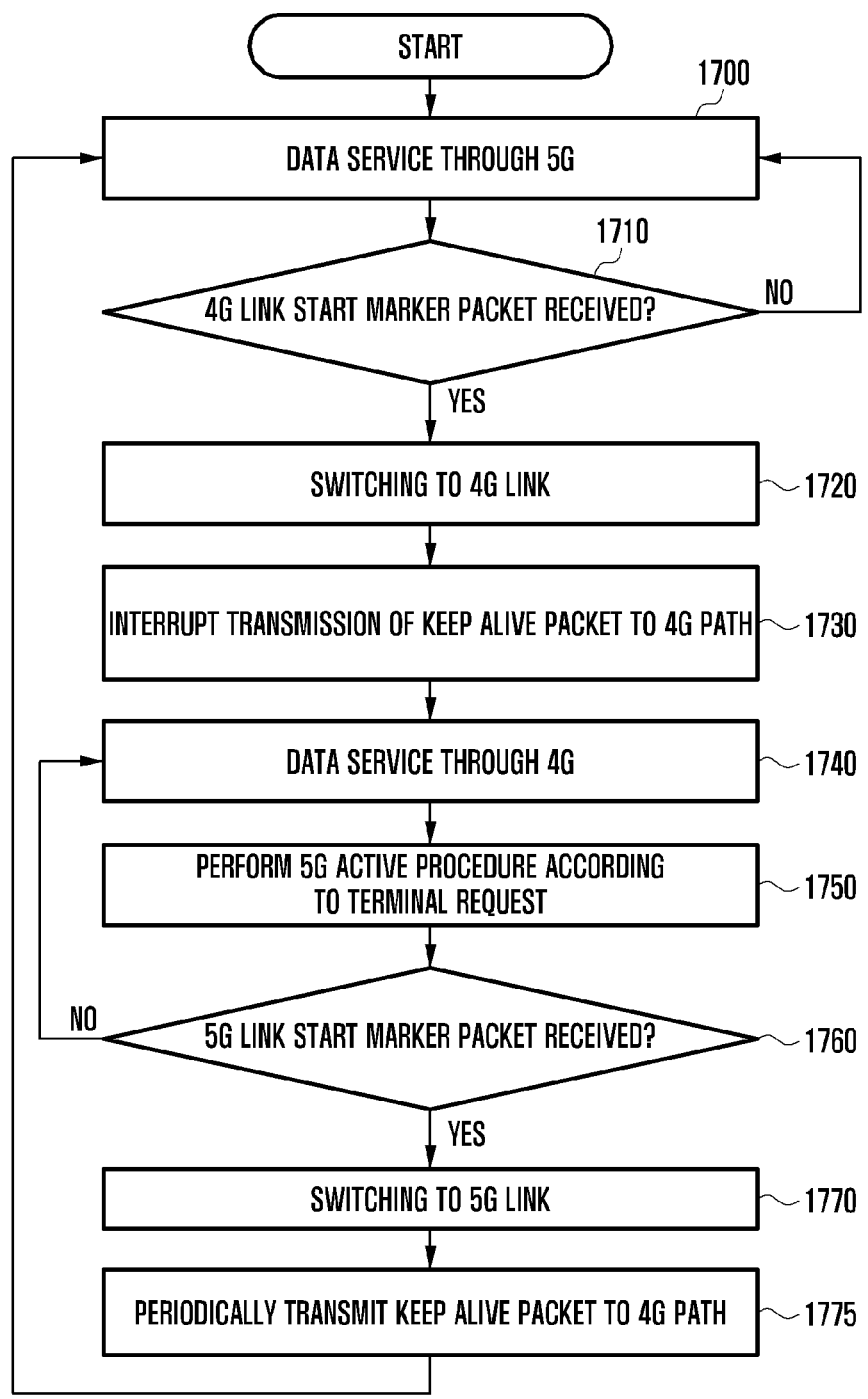
FIG. 17 is a flowchart illustrating fast 4G fallback and 5G recovery procedures in the case of a 5G radio problem of a GW in a dependent 4G-5G RRC state mode.

FIG. 17 is a flowchart illustrating fast 4G fallback and 5G recovery procedures in the case of a 5G radio problem of a GW in a dependent 4G-5G RRC state mode.

At operation 1700, the GW performs the data service through 5G. In this case, the GW, at operation 1710, identifies whether the 4G link start marker packet is received, and if the packet is received, the GW performs switching to the 4G link (1720), whereas if the packet is not received, the GW returns to operation 1700.

If the GW pre-transmits the keep alive packet to the 4G path after the switching to the 4G link is performed at operation 1720, the GW interrupts transmission of the keep alive packet. Thereafter, the GW perform the data service through 4G with the terminal.

Thereafter, if 5G is in an idle state, the GW performs an active procedure according to the request from the terminal (1750). If 5G is already in the active state, the above operation can be omitted. At operation 1760, the GW identifies whether the 5G link start marker packet is received, and if the packet is received, the GW performs switching to the 5G link (1770). If fast 4G fallback is necessary, the GW periodically transmits the keep alive packet to the 4G path in order to maintain the 4G RRC in a connected state (1775), and thereafter, the GW returns to operation 1700 to perform the data service through 5G.

If the 5G link start marker packet is not received at operation 1760, the GW returns to operation 1740 to perform the data service using the 4G connection.

Figure 18:
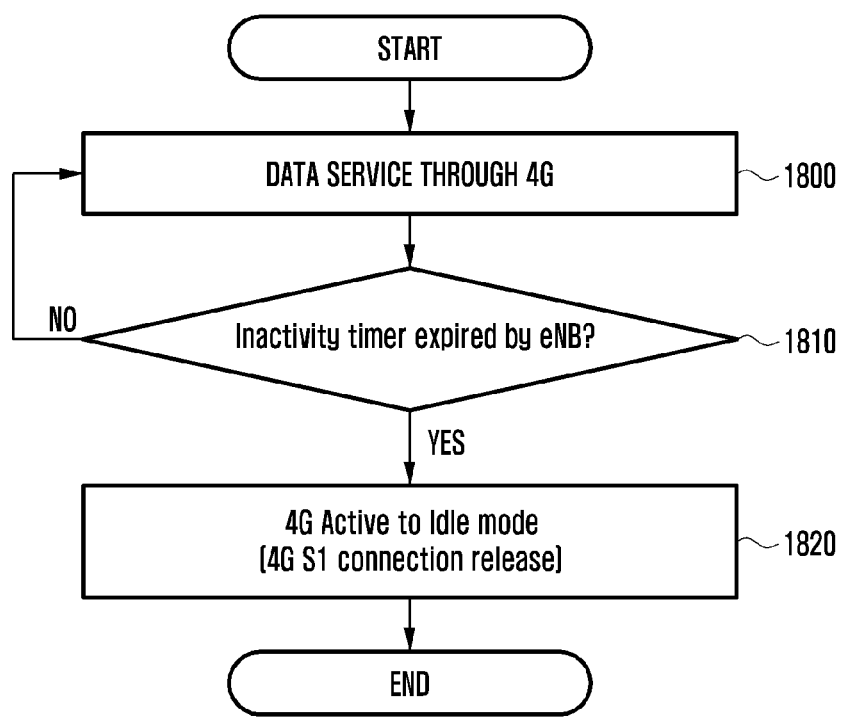
FIG. 18 is a flowchart illustrating 4G and 5G idle procedures in the case of no traffic of a GW in a dependent 4G-5G RRC state mode.

FIG. 18 is a flowchart illustrating 4G and 5G idle procedures in the case of no traffic of a GW in a dependent 4G-5G RRC state mode. In FIG. 18, the GW is performing a data service through 4G.

At operation 1800, the GW performs the data service through 4G. If user traffic exists, the GW continuously performs the data service, whereas if the user traffic does not exist, the 4G base station starts an inactivity timer. The GW determines whether the inactivity timer expires (1810), and if the inactivity timer in the 4G base station expires due to the continuous nonexistence of the user traffic, the GW performs 4G active to idle procedure (4G S1 connection release) at operation 1820. If the inactivity timer does not expire, the GW returns to operation 1800 to perform the data service through 4G.

Figure 19:
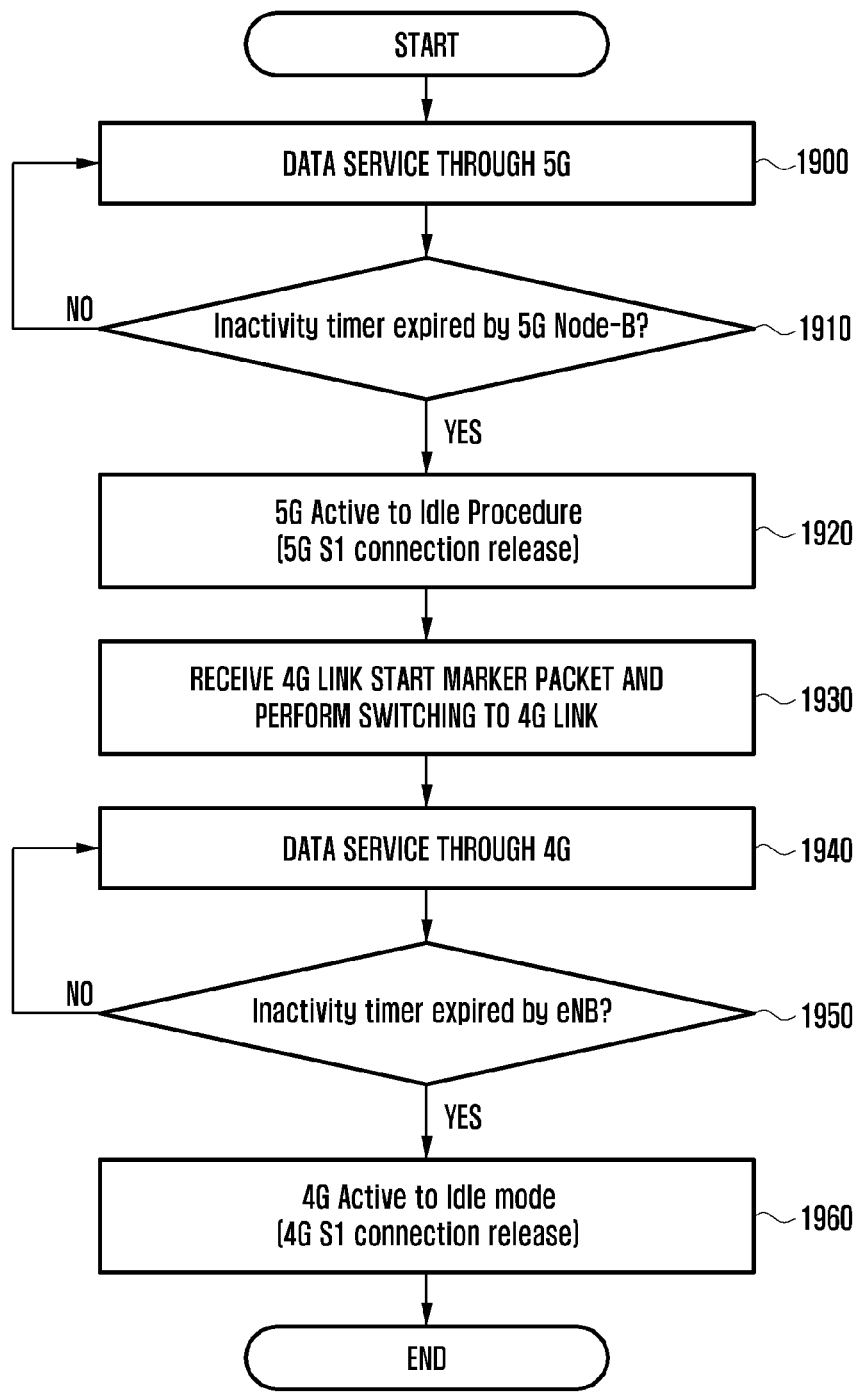
FIG. 19 is another flowchart illustrating 4G and 5G idle procedures in the case of no traffic of a GW in a dependent 4G-5G RRC state mode.

FIG. 19 is another flowchart illustrating 4G and 5G idle procedures in the case of no traffic of a GW in a dependent 4G-5G RRC state mode. In FIG. 19, the GW is performing a data service through 5G.

At operation 1900, the GW performs the data service through 5G. If user traffic exists, the GW continuously performs the data service, whereas if the user traffic does not exist, the 5G base station starts an inactivity timer. The GW determines whether the inactivity timer expires (1910), and if the inactivity timer in the 5G base station expires due to the continuous nonexistence of the user traffic, the GW performs 5G active to idle procedure (5G S1 connection release) at operation 1920. Thereafter, the GW receives the 4G link start marker packet from the terminal and it performs switching to the 4G link (1930). Thereafter, if necessary, the GW performs the data service through 4G (1940).

At operation 1910, if the user traffic exists and the inactivity timer does not expire, the GW returns to operation 1900 to continuously perform the data service.

After operation 1940, if the user traffic exists, the GW continuously performs the data service using 4G, whereas if the user traffic does not exist, the 4G base station starts the inactivity timer. The GW determines whether the inactivity timer expires (1950), and if the inactivity timer in the 4G base station expires due to the continuous nonexistence of the user traffic, the GW performs 4G active to idle procedure (4G S1 connection release) at operation 1960.

At operation 1950, if the user traffic exists and the inactivity timer does not expire, the GW returns to operation 1940 to continuously perform the data service.

Next, the operation of the 5G GW (hereinafter, GW) in an independent 4G-5G RRC state mode will be described.

Figure 20:
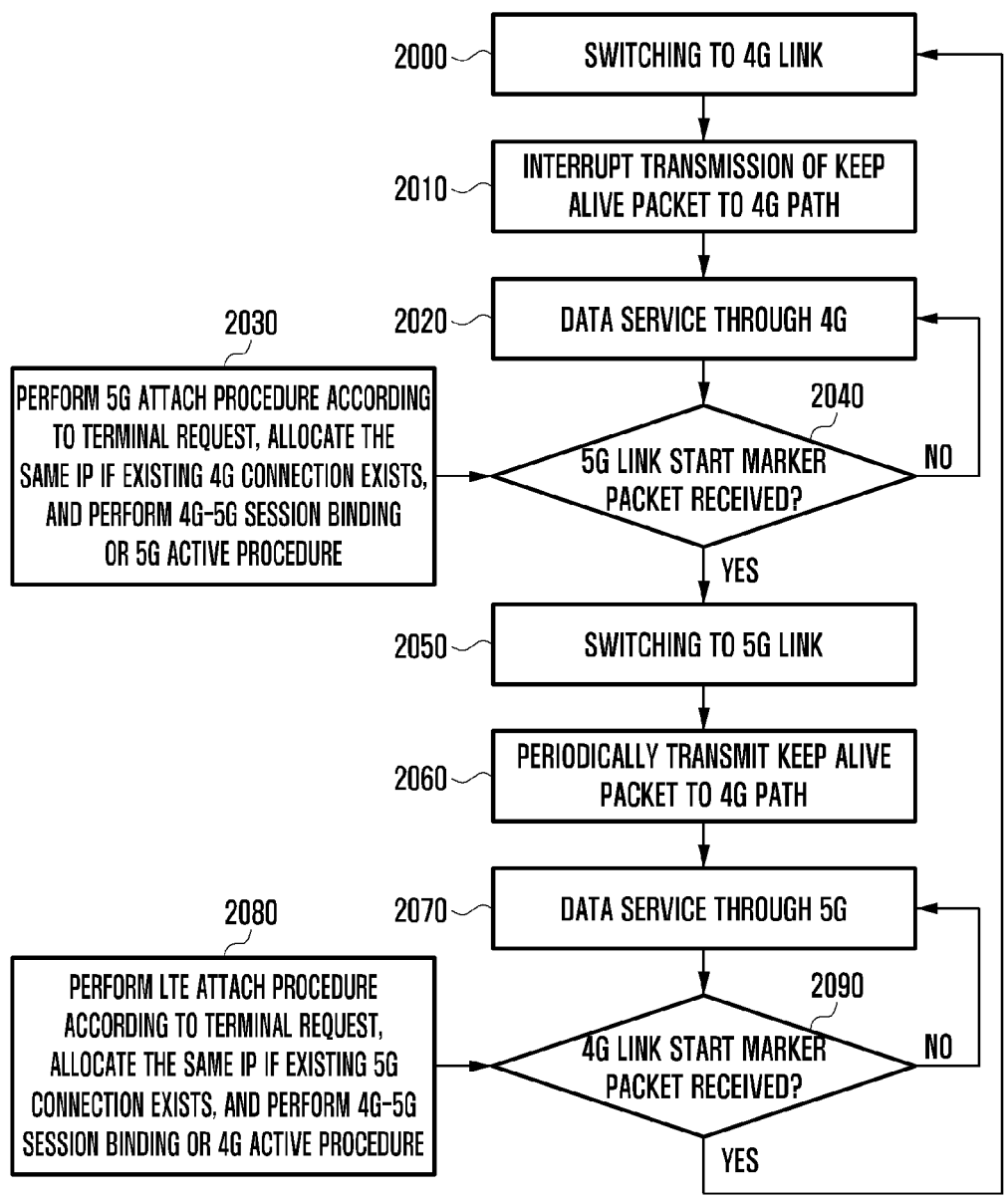
FIG. 20 is a flowchart illustrating 4G and 5G initial attach and active procedures of a GW in an independent 4G-5G RRC state mode.

FIG. 20 is a flowchart illustrating 4G and 5G initial attach and active procedures of a GW in an independent 4G-5G RRC state mode.

At operation 2030, the GW performs the 5G attach procedure according to the request from the terminal, generates Internet APN through 5G and 5G signaling APN, and performs allocation of the same IP as that of 4G and 4G-5G session binding if the existing 4G connection exists in the performing process. Further, if 5G is in an idle state, the GW performs an active procedure and moves to operation 2040. Further, at operation 2080, the GW performs the LTE attach procedure according to the request from the terminal, generates the Internet APN through 4G and 4G signaling APN, and performs allocation of the same IP and 4G-5G session binding if the existing 5G connection exists in the performing process, or the GW performs the active procedure and then it move to operation 2090 if 4G is in an idle state.

At operation 2040, the GW identifies whether the 5G link start marker packet is received from the terminal, and if the 5G link start marker packet is received, the GW performs switching to the 5G link (2050). If the path setup to 5G is immediately performed during an initial access, operations 2040 and 2050 can be omitted. If it is determined that fast 4G fallback is necessary, the GW periodically transmits the keep alive packet to the 4G path in order to maintain the 4G RRC in a connected state (2060). Thereafter, the GW performs the data service through 5G (2070).

Thereafter, at operation 2090, the GW identifies whether the 4G link start marker packet is received from the terminal, and if the packet is received, the GW perform the switching to the 4G link (2000). If the path setup to 4G is immediately performed during the initial access, operations 2090 and 2000 can also be omitted. If the keep alive packet is pre-transmitted to the 4G path after operation 2000, the GW interrupts transmission of the keep alive packet (2010). Thereafter, the GW performs the data service through 4G (2020).

If the 4G link start marker packet is not received from the terminal, the GW returns to operation 2070.

The operation of the GW in fast 4G fallback and 5G recovery procedures in the case where the 5G radio problem occurs in an independent 4G-5G RRC state mode is the same as that as illustrated in FIG. 17.

The operation of the GW in 4G and 5G idle procedures in the case of no traffic in an independent 4G-5G RRC state mode is the same as that as illustrated in FIGS. 18 and 19.

Hereinafter, the definition and format of a message used in the 4G-5G interworking architecture will be described.

First, the definition and format of a link start marker packet message will be described.

The message is transmitted from the UE to the 5G GW through a 4G eNB, or it is transmitted from the UE to the 5G GW through a 5G Node-B. The message is for the UE to request switching notification and GW switching from the GW after the 4G-5G switching operation.

Figure 21:
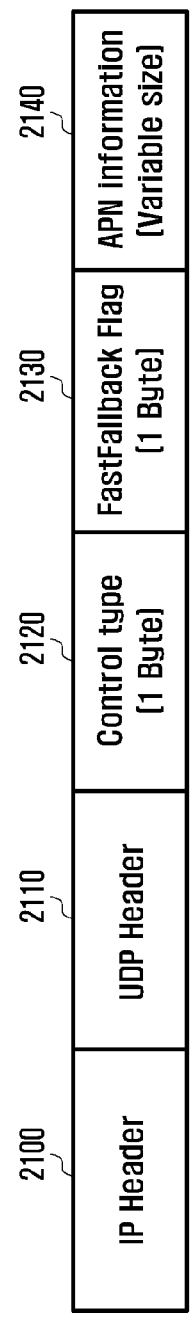
FIG. 21 is a diagram illustrating a format of a link start marker packet message.

FIG. 21 is a diagram illustrating a format of a link start marker packet message.

The message includes at least one of an IP header 2100, a UDP header 2110, a control message type indicator 2120, a fast fallback control flag 2130, and APN information 2140. The control message type indicator 2120 [1 byte] may be a 4G start marker packet (0x00) or a 5G start marker packet (0x01), and the fast fallback control flag 2130 [1 byte] may be fast fallback (keep alive packet non-transmission) non-applied (0x00) or fast fallback (keep alive packet transmission) applied (0x01). Further, the APN information 2140 for discriminating the APN in multiple PDN connection (APN network identifier and APN operator identifier) [variable size] may be, for example, network ID.Mnc<MNC>.mcc<MCC>.gprs.

Second, the definition and format of a keep alive packet message will be described.

The message is transmitted from the 5G GW to the UE through the 4G eNB, and it is periodically transmitted to the corresponding network in order to maintain the RRC of an available network (e.g., 4G) that can be switched for fast fallback in a connected state.

Figure 22:
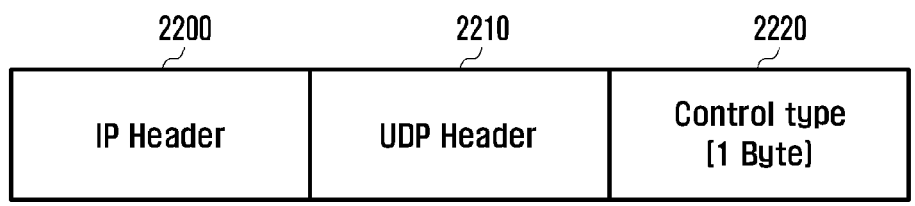
FIG. 22 is a diagram illustrating a keep alive packet message.

FIG. 22 is a diagram illustrating a keep alive packet message.

The message includes at least one of an IP header 2200, a UDP header 2210, and a control message type indicator 2220. The control message type indicator 2220 [1 byte] may be a keep alive packet (0x03).

Hereinafter, another embodiment of a signaling message according to the disclosure will be described.

First, a 4G start marker message will be described. The 4G start marker message is transmitted from the UE to the 5G GW through the 4G eNB, and the message ID may be 0x00 00 00 04. This message is for the UE to perform switching notification to the 5G GW after the switching operation from 5G to 4G, and for the 5G GW to request switching from 5G to 4G, and it may be repeatedly transmitted with a specific period and the specific number of transmissions for reliable reception during transmission to the 5G GW. As an example, the message may be repeatedly transmitted 10 times for each 100 ms.

Second, a 5G start marker message will be described. The 5G start marker message is transmitted from the UE to the 5G GW through the 5G NB, and the message ID may be 0x00 00 00 05. This message is for the UE to perform switching notification to the 5G GW after the switching operation from 4G to 5G, and for the 5G GW to request switching from 4G to 5G. The message may be repeatedly transmitted with a specific period and the specific number of transmissions for reliable reception during transmission to the 5G GW. As an example, the message may be repeatedly transmitted 10 times for each 100 ms.

Third, a 4G start complete message will be described. This message is transmitted from the 5G GW to the UE through the 4G eNB, and the message ID may be 0x00 00 00 A4. Basically, the UE and the 5G GW can perform the switching immediately after a 4G start marker is transmitted and received, but if it is selectively necessary, the 5G GW may transmit an identification response message indicating that the switching has been normally performed with respect to the switching operation from 5G to 4G being requested from the UE through the 4G start marker. The corresponding message may be repeatedly transmitted with a specific period and the specific number of transmissions for reliable reception during transmission to the UE. As an example, the message may be repeatedly transmitted 10 times for each 100 ms.

Fourth, a 5G start complete message will be described. The 5G start complete message is transmitted from the 5G GW to the UE through the 5G NB, and the message ID may be 0x00 00 00 A5. Basically, the UE and the 5G GW can perform the switching immediately after the 4G start marker is transmitted and received, but if it is selectively necessary, the 5G GW may transmit an identification response message indicating that the switching has been normally performed with respect to the switching operation from 4G to 5G being requested from the UE through the 5G start marker. The corresponding message may be repeatedly transmitted with a specific period and the specific number of transmissions for reliable reception during transmission to the UE. As an example, the message may be repeatedly transmitted 10 times for each 100 ms.

Fifth, a keep alive message will be described. The keep alive message is transmitted from the 5G GW to the UE through the 4G eNB, or from the 5G GW to the UE through the 5G NB, and the message ID may be 0x00 00 00 0F. The message is periodically transmitted to the corresponding network in order to maintain (keep alive) the RRC connection of an available network (e.g., 4G) that can be switched for fast fallback.

Figure 23:
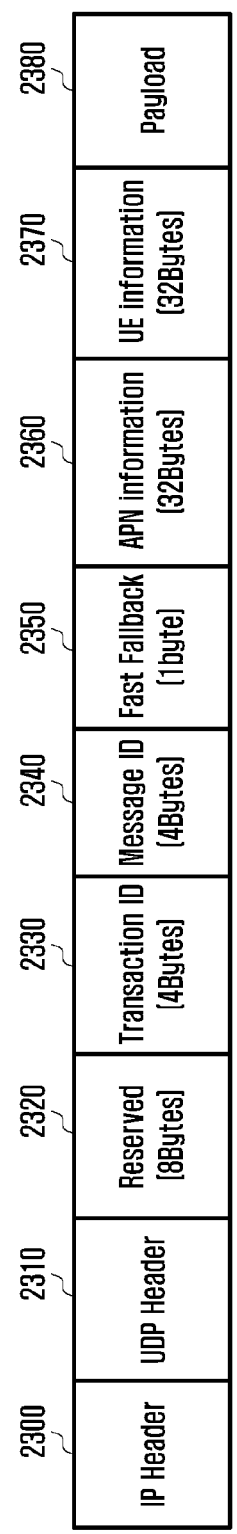
FIG. 23 is a diagram illustrating a basic message format that can be applied to various signaling messages according to an embodiment of the disclosure.

FIG. 23 is a diagram illustrating a basic message format that can be applied to various signaling messages according to an embodiment of the disclosure.

With reference to FIG. 23, the basic message format is composed of an IP header 2300, a UDP header 2310, a reserved ID (8 bytes) 2320, a transaction IC (4 bytes) 2330, a message ID (4 bytes) 2340, fast fallback related information (1 byte) 2350, APN information (32 bytes) 2360, UE information (32 bytes) 2370, and a payload. The lengths of the above-described fields are exemplary, and they can be changed.

The reserved ID 2320 is composed of 8 bytes that can be set to "0" in all. The transaction ID is composed of 4 bytes, and the ID value may start from "1", and in particular, the ID value can start from "1", and it can be increased by 1 whenever the link change occurs. Further, in the case of repeatedly transmitting the same message for reliable transmission, the same transaction ID may be used.

The message ID is a field indicating the attribute of the message with 4 bytes, and a 4G start marker may be 0x00 00 00 A4, and a 5G start marker may be 0x00 00 00 05. Further, a 4G start complete may be 0x00 00 00 A4, a 5G start complete may be 0x00 00 00 A5, and keep alive may be 0x00 00 00 OF.

The fast fallback field may be selectively included, and it is a flag for requesting the 5G GW to transmit a keep alive packet if fast fallback is necessary during transmission of the 5G link start marker. If it is desired not to transmit the keep alive packet, "0x00" may be set, whereas if it is desired to transmit the keep alive packet, "0x01" may be set.

The APN information may be selectively included, and it is information for discriminating the APN in the multiple PDN connection. UE information may be selectively included, and it is information for discriminating the 5G UE.

The payload may be filled by "F" up to the last byte.

Figure 24:
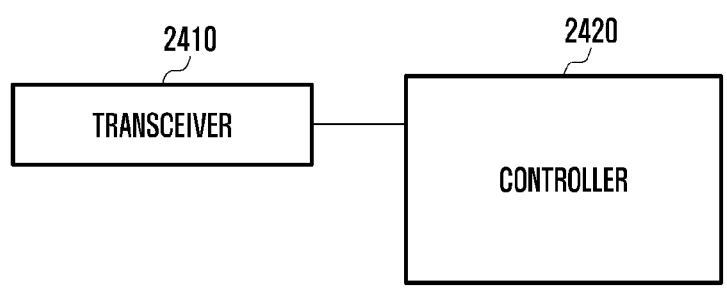
FIG. 24 is a diagram illustrating an internal structure of a terminal according to an embodiment of the disclosure.

FIG. 24 is a diagram illustrating an internal structure of a terminal according to an embodiment of the disclosure.

As illustrated in FIG. 24, a terminal according to an embodiment of the disclosure may include a transceiver 2410 and a controller 2420.

The transceiver 2410 may transmit and receive signals with a 4G or 5G base station.

The controller 2420 may control a signal flow between respective blocks so that the terminal according to an embodiment of the disclosure can operate. As an example, the controller 2420 may independently perform access procedures with respect to a first wireless network and a second wireless network. Further, in accordance with the wireless link states of the first and second wireless networks, the controller 2420 may control to perform communication for the same service through the first or second wireless network.

Further, the controller 2420 may control to detect entry to a coverage of the second wireless network during performing of the first wireless network, and to transmit a second wireless network link start marker packet to a node through a second wireless network signaling access point name (APN) generated between the terminal and the node of the second wireless network.

Further, while performing communication through the second wireless network, the controller 2420 may control to receive a packet for maintaining a connection to the first wireless network from the node.

The above-described function of the controller 2420 is exemplary, and it is to be noted that the controller can be configured to perform all functions described in the description.

Figure 25:
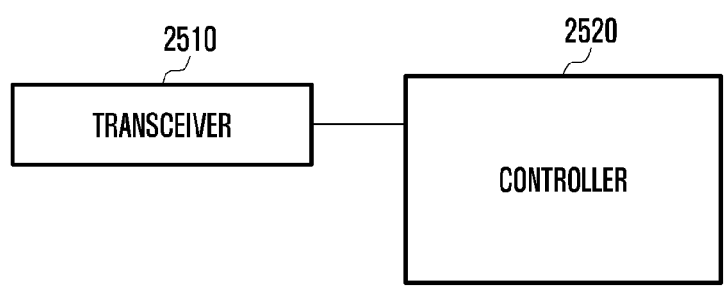
FIG. 25 is a diagram illustrating an internal structure of a gateway device according to an embodiment of the disclosure.

FIG. 25 is a diagram illustrating an internal structure of a gateway device according to an embodiment of the disclosure.

As illustrated in FIG. 25, a gateway device according to an embodiment of the disclosure may include a transceiver 2510 and a controller 2520.

The transceiver 2510 may transmit and receive signals with certain nodes of the wireless communication system.

The controller 2520 may control a signal flow between respective blocks so that the gateway device according to an embodiment of the disclosure can operate.

As an example, the controller 2520 may control to configure an APN for providing the same service to a certain terminal through a first wireless communication network or a second wireless communication network, and to provide the service to the terminal through the APN based on a wireless link state between the terminal and the first wireless communication network or a wireless link state between the terminal and the second wireless communication network.

Further, the controller 2520 may control to configure a first wireless communication network signaling between the terminal and the first wireless communication network if an access request through the first wireless communication network is received from the terminal, and to configure a second wireless communication network signaling APN between the terminal and the second wireless communication network if an access request through the second wireless communication network is received from the terminal.

Further, while performing communication through the second wireless network, the controller 2520 may control to transmit a packet for maintaining a connection between the terminal and the first wireless communication network to the terminal.

The above-described function of the controller 2520 is exemplary, and it is to be noted that the controller can be configured to perform all functions described in the description.

The interworking system without dependency between the legacy 4G network and the 5G network described in the disclosure has the following effects. First, 5G service launch and development can be performed quickly and conveniently without an impact to the 4G base station operated in the existing commercial network through the interworking system proposed in the disclosure. Second, it is possible to support a seamless service between 4G and 5G through the same IP address allocation with respect to one service in 4G and 5G cores. Third, the stability of a 5G radio link (mmWave) may be lowered in a mobile environment, but in order to secure the stability of the service even in such an environment, the UE that can determine the radio state most quickly performs fast link switch decision between 4G and 5G, and thus the 4G fallback can be quickly performed.

Although preferred embodiments of the disclosure have been described in the specification and drawings and specific wordings have been used, these are merely used as general meanings to assist those of ordinary skill in the art to gain a comprehensive understanding of the disclosure and do not limit the scope of the disclosure. It will be apparent to those of ordinary skill in the art to which the disclosure pertains that various modifications are possible based on the technical concept of the disclosure in addition to the embodiments disclosed herein.

The invention claimed is:

1. A method of a terminal in a wireless communication system, the method comprising:

establishing a packet data network (PDN) connection based on a common access point name (APN) with a gateway in a case that the terminal is in a radio resource control (RRC) connection state on a first communication system, the common APN being associated with both the first communication system and a second communication system for inter-radio access technology (RAT) switching between the first communication system and the second communication system;

establishing a second PDN connection based on a second signaling APN related to the second communication system with the gateway;

performing switching from the first communication system to the second communication system;

transmitting, to the gateway, a link start marker packet indicating the switching from the first communication system to the second communication system, based on the second PDN connection; and transmitting and receiving data based on the second communication system.

2. The method of claim 1, further comprising:
receiving a keep alive packet from the gateway based on a first PDN connection established based on a first signaling APN related to the first communication system.

3. The method of claim 2, wherein the keep alive packet includes at least one of an IP header, a UDP header, or a control message type indicator, and the control message type indicator can indicate the keep alive packet.

4. The method of claim 1, wherein the link start marker packet includes at least one of an Internet protocol (IP) header, a user datagram protocol (UDP) header, a control message type indicator, a fast fallback control flag, or APN information.

5. A method of a gateway in a wireless communication system, the method comprising:
establishing a packet data network (PDN) connection based on a common access point name (APN) with a terminal the common APN being associated with both a first communication system and a second communication system for inter-radio access technology (RAT) switching between the first communication system and the second communication system;
establishing a second PDN connection based on a second signaling APN related to the second communication system with the terminal;
receiving, from the terminal, a link start marker packet indicating a switching from the first communication system to the second communication system, based on the second PDN connection;
performing switching from a first communication system to the second communication system; and
transmitting and receiving data based on the second communication system,
wherein the PDN connection established based on the common APN is established in a case that the terminal is in a radio resource control (RRC) connection state on the first communication system.

6. The method of claim 5, further comprising:
transmitting a keep alive packet to the terminal based on a first PDN connection established based on a first signaling APN related to the first communication system.

7. The method of claim 6, wherein the keep alive packet includes at least one of an IP header, a UDP header, or a control message type indicator, and the control message type indicator can indicate the keep alive packet.

8. The method of claim 5, wherein the link start marker packet includes at least one of an Internet protocol (IP) header, a user datagram protocol (UDP) header, a control message type indicator, a fast fallback control flag, or APN information.

9. A terminal in a wireless communication system, the terminal comprising:
a transceiver configured to transmit and receive signals; and
a controller connected to the transceiver and configured to control to:
establish a packet data network (PDN) connection based on a common access point name (APN) with a gateway in a case that the terminal is in a radio resource control (RRC) connection state on a first communication system, the common APN being associated with both the first communication system and a second communication system for inter-radio access technology (RAT) switching between the first communication system and the second communication system,
establish a second PDN connection based on a second signaling APN related to the second communication system with the gateway,
perform switching from the first communication system to the second communication system,
transmit, to the gateway, a link start marker packet indicating the switching from the first communication system to the second communication system, based on the second signaling APN, and
transmit and receive data based on the second communication system.

10. The terminal of claim 9, wherein the controller is configured to further control to receive a keep alive packet from the gateway based on a first PDN connection established based on a first signaling APN related to the first communication system.

11. The terminal of claim 10, wherein the keep alive packet includes at least one of an IP header, a UDP header, or a control message type indicator, and the control message type indicator can indicate the keep alive packet.

12. The terminal of claim 9, wherein the link start marker packet includes at least one of an Internet protocol (IP) header, a user datagram protocol (UDP) header, a control message type indicator, a fast fallback control flag, or APN information.

13. A gateway in a wireless communication system, the gateway comprising:
a transceiver configured to transmit and receive signals; and
a controller connected to the transceiver and configured to control to:
establish a packet data network (PDN) connection based on a common access point name (APN) with a terminal, the common APN being associated with both a first communication system and a second communication system for inter-radio access technology (RAT) switching between the first communication system and the second communication system,
establish a second PDN connection based on a second signaling APN related to the second communication system with the terminal,
receive, from the terminal, a link start marker packet indicating the switching from the first communication system to the second communication system, based on the second PDN connection,
perform switching from a first communication system to the second communication system, and
transmit and receive data based on the second communication system,
wherein the PDN connection established based on the common APN is established in a case that the terminal is in a radio resource control (RRC) connection state on the first communication system.

14. The gateway of claim 13, wherein the controller is configured to further control to transmit a keep alive packet to the terminal based on a first PDN connection established based on a first signaling APN related to the first communication system.

15. The gateway of claim 14, wherein the link start marker packet includes at least one of an Internet protocol (IP)

header, a user datagram protocol (UDP) header, a control message type indicator, a fast fallback control flag, or APN information, and wherein the keep alive packet includes at least one of the IP header, the UDP header, or the control message type indicator, and the control message type indicator can indicate the keep alive packet.

* * * * *